United States Patent
Otomo et al.

(10) Patent No.: US 9,465,096 B2
(45) Date of Patent: Oct. 11, 2016

(54) DETERMINING METHOD, COMPUTER PRODUCT, DETERMINING APPARATUS, AND DETERMINING SYSTEM

(71) Applicant: FUJITSU LIMITED, Kawasaki-shi, Kanagawa (JP)

(72) Inventors: Toshiya Otomo, Kawasaki (JP); Koichiro Yamashita, Hachioji (JP); Takahisa Suzuki, Yokohama (JP); Hiromasa Yamauchi, Usakos (NA); Koji Kurihara, Kawasaki (JP); Yuta Teranishi, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 44 days.

(21) Appl. No.: 14/636,731

(22) Filed: Mar. 3, 2015

(65) Prior Publication Data

US 2015/0177361 A1 Jun. 25, 2015

Related U.S. Application Data

(63) Continuation of application No. PCT/JP2012/072503, filed on Sep. 4, 2012.

(51) Int. Cl.
*H04W 4/02* (2009.01)
*G01S 5/02* (2010.01)
*H04W 84/18* (2009.01)

(52) U.S. Cl.
CPC .............. *G01S 5/0289* (2013.01); *H04W 4/02* (2013.01); *H04W 4/023* (2013.01); *H04W 84/18* (2013.01)

(58) Field of Classification Search
CPC ............................ G01S 5/0289; H04W 4/023
See application file for complete search history.

(56) References Cited

U.S. PATENT DOCUMENTS

| 5,596,330 A * | 1/1997 | Yokev | G01S 1/026 342/387 |
|---|---|---|---|
| 2005/0003832 A1 | 1/2005 | Osafune et al. | |

(Continued)

FOREIGN PATENT DOCUMENTS

| JP | 2004-356677 | 12/2004 |
|---|---|---|
| JP | 2006-229845 | 8/2006 |

(Continued)

OTHER PUBLICATIONS

International Search Report mailed Oct. 2, 2012 in corresponding international application PCT/JP2012/072503.

(Continued)

*Primary Examiner* — Mazda Sabouri

(74) *Attorney, Agent, or Firm* — Staas & Halsey LLP

(57) ABSTRACT

A determining method includes obtaining by each monitoring apparatus among plural monitoring apparatuses disposed encompassing a given area having plural wireless communications apparatuses, hop count information that indicates a hop count of a wireless signal transmitted by one wireless communications apparatus among the wireless communications apparatuses and received by the monitoring apparatus via multi-hop communication by the wireless communications apparatuses; calculating by each monitoring apparatus, an estimated line that represents candidates of a position of the one wireless communications apparatus, the estimated line being calculated from an estimated distance between the monitoring apparatus and the one wireless communications apparatus, based on the hop count; correcting by each monitoring apparatus, the calculated estimated line based on information indicating a node-less area in which no wireless communications apparatus of the given area is present; and determining the position of the one wireless communications apparatus based on intersections of the corrected estimated lines.

10 Claims, 14 Drawing Sheets

(56) References Cited

U.S. PATENT DOCUMENTS

| | | | |
|---|---|---|---|
| 2008/0309556 A1* | 12/2008 | Hohl | G01S 5/0289 342/451 |
| 2009/0128902 A1* | 5/2009 | Niv | G02B 5/1847 359/482 |
| 2010/0231357 A1 | 9/2010 | Hong et al. | |
| 2011/0045844 A1* | 2/2011 | Muller | G01S 5/0205 455/456.1 |
| 2011/0141909 A1* | 6/2011 | Hibara | G01S 5/0036 370/241 |

FOREIGN PATENT DOCUMENTS

| | | |
|---|---|---|
| JP | 2007-221541 | 8/2007 |
| JP | 2010-213278 | 9/2010 |

OTHER PUBLICATIONS

Akiko Iwaya et al., "GOMASHIO: Model for Propagating Location Information in Sensor Networks" IPSJ SIG Notes, Nov. 15, 2001, vol. 2001, No. 108, pp. 23-30.

Mo Li et al. "Rendered Path: Range-Free Localization in Anisotropic Sensor Networks with Holes" Proceedings of the 13th Annual ACM International Conference on Mobile Computing and Networking (MobiCom'07) Sep. 9, 2007, p. 51-62.

IPRP for PCT/JP2012/072503 (Oct. 2, 2012).

* cited by examiner

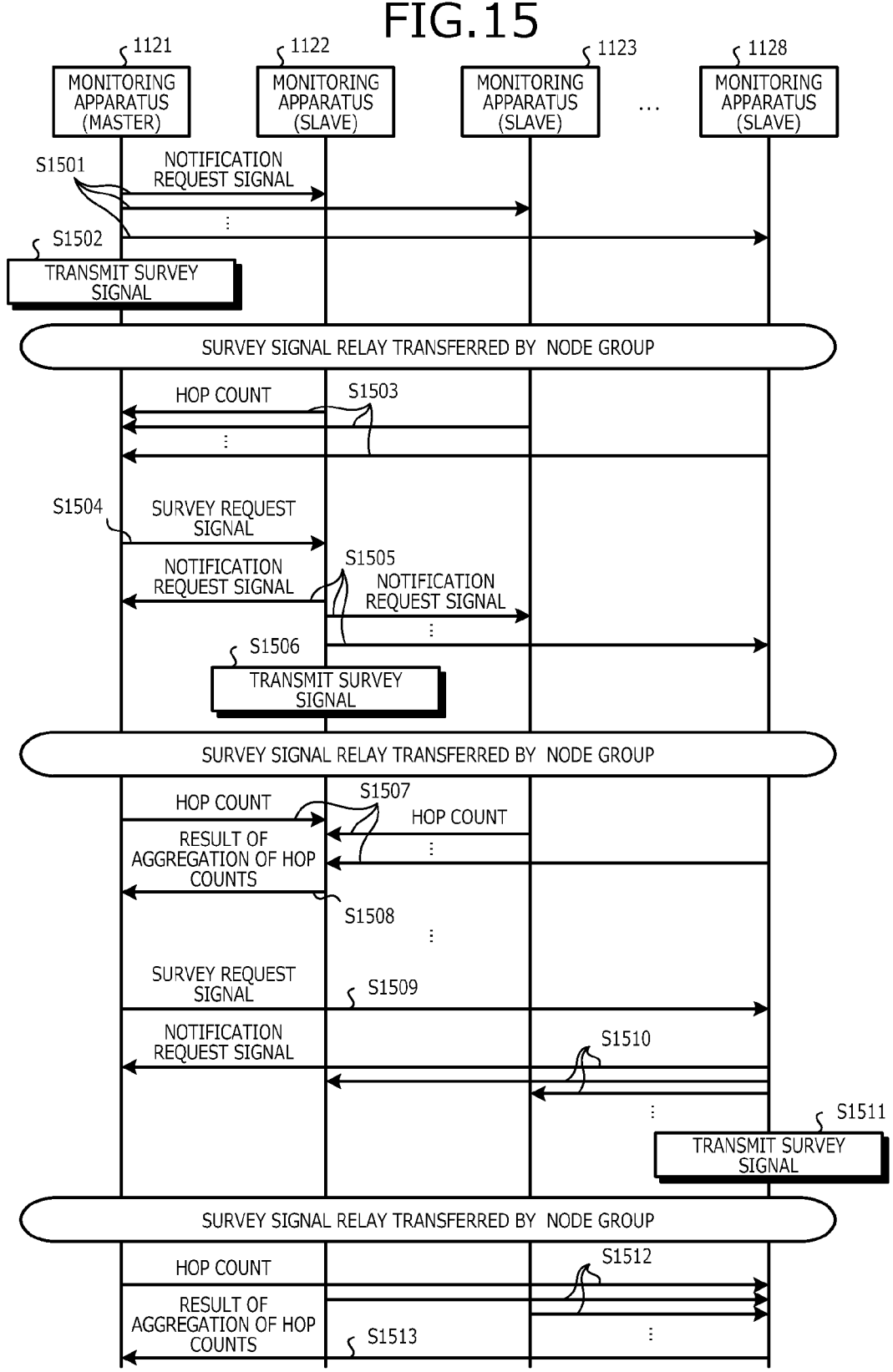

DETERMINING METHOD, COMPUTER PRODUCT, DETERMINING APPARATUS, AND DETERMINING SYSTEM

CROSS REFERENCE TO RELATED APPLICATIONS

This application is a continuation application of International Application PCT/JP2012/072503, filed on Sep. 4, 2012 and designating the U.S., the entire contents of which are incorporated herein by reference.

FIELD

The embodiments discussed herein are related to a determining method, a determining program, a determining apparatus, and a determining system.

BACKGROUND

A technique of using plural receiving apparatuses and plural wireless terminals to determine the position of a wireless terminal is known (for example, refer to Japanese Laid-Open Patent Publication No. 2007-221541). A radio frequency identification (RFID) system is further known in which plural monitoring apparatuses and plural nodes (wireless sensors, etc.) are used (for example, refer to Japanese Laid-Open Patent Publication No. 2010-213278).

Furthermore, according to a known technique, in an ad hoc network, the distance between a mobile terminal apparatus and each base station is estimated based on the hop count of a wireless signal from the mobile terminal apparatus to the base stations, and based on the estimation result, the position of the mobile terminal apparatus is determined (for example, refer to Japanese Laid-Open Patent Publication No. 2006-229845). Sensor networks (wireless sensor networks) are further known in which plural sensor-equipped wireless terminals are interspersed and work in concert to enable environmental and/or physical states to be obtained.

Nonetheless, with the conventional techniques above, distribution of the interspersed nodes is not uniform and if an area without a node is present, a wireless signal may be transmitted by being diverted away from the area. In this case, a problem arises in that the position of the transmission source of the wireless signal cannot be accurately determined.

SUMMARY

According to an aspect of an embodiment, a determining method includes obtaining by each monitoring apparatus among a plural monitoring apparatuses disposed encompassing a given area having plural wireless communications apparatuses, hop count information that indicates a hop count of a wireless signal transmitted by one wireless communications apparatus among the plural wireless communications apparatuses and received by the monitoring apparatus via multi-hop communication by the plural wireless communications apparatuses; calculating by each monitoring apparatus among the plural monitoring apparatuses, an estimated line that represents candidates of a position of the one wireless communications apparatus, the estimated line being calculated from an estimated distance between the monitoring apparatus and the one wireless communications apparatus, based on the hop count indicated by the obtained hop count information; correcting by each monitoring apparatus among the plural monitoring apparatuses, the calculated estimated line based on information indicating a nodeless area in which no wireless communications apparatus of the given area is present; and determining the position of the one wireless communications apparatus based on intersections of the corrected estimated lines.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 15 is a sequence diagram depicting an example of a monitoring operation of the hop count by the determining system.

DESCRIPTION OF EMBODIMENTS

Embodiments of a determining method, a determining program, a determining apparatus, and a determining system will be described in detail with reference to the accompanying drawings.

Figure 1:
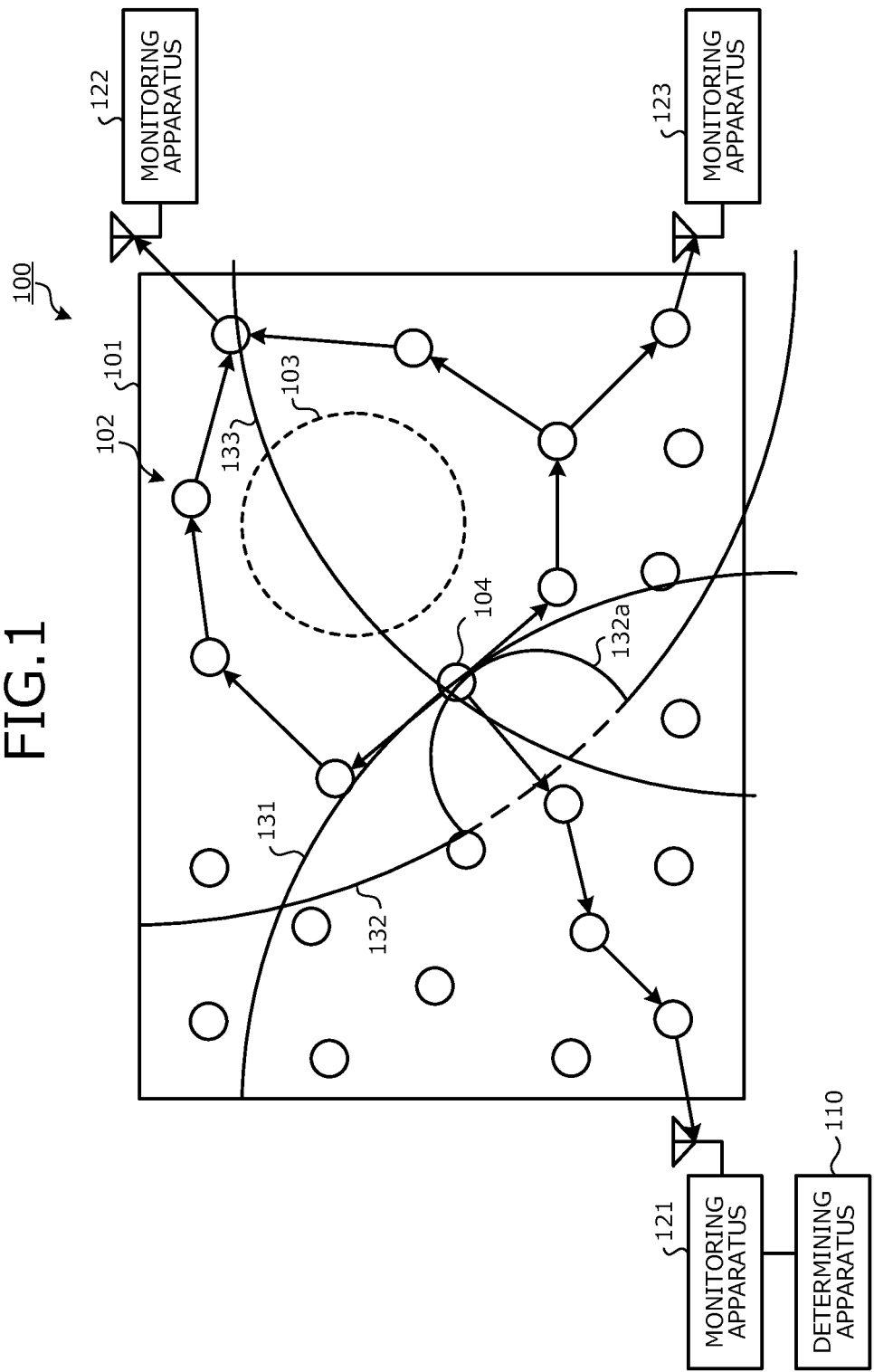
FIG. 1 is a diagram depicting an example of a determining system according to a first embodiment.

FIG. 1 is a diagram depicting an example of a determining system according to a first embodiment. As depicted in FIG. 1, a determining system 100 according to the first embodiment includes a determining apparatus 110 and monitoring apparatuses 121 to 123.

The determining apparatus 110 is an apparatus that can communicate with the monitoring apparatuses 121 to 123. Further, the determining apparatus 110 may be an apparatus that is provided independently of the monitoring apparatuses 121 to 123 or an apparatus that is provided in any one among the monitoring apparatuses 121 to 123. In the example depicted in FIG. 1, the determining apparatus 110 is provided in the monitoring apparatus 121.

The monitoring apparatuses 121 to 123 are disposed to surround a given area 101. The monitoring apparatuses 121 to 123 monitor signals transferred by multi-hop communication among a node group 102. Multi-hop communication, for example, is communication by mutual multistage connections of numerous terminals (the node group 102), without mediation of access points. Nodes of the node group 102 are interspersed in the given area 101. The given area 101, for example, is an area filled with matter such as concrete, soil, water, air, etc. Further, the given area 101 may be a vacuum space such as cosmic space.

The node group 102 is plural wireless communications apparatuses that form a sensor network. More specifically, each node of the node group 102 is a wireless communications apparatus that can wirelessly communication with nearby wireless communications apparatuses. Further, the nodes of the node group 102 have sensors that detect temperature, pressure, sound, etc., and transmit wireless signals that indicate sensing results obtained by the sensors.

Each node of the node group 102 receives wireless signals transmitted from nearby nodes, and transfers the received wireless signals to other nearby nodes whereby, the wireless signals are transferred by multiple hops. As a result, a wireless signal transmitted by a node of the node group 102 is transferred by multiple hops by other nodes of the node group 102, and received by a nearby wireless communications apparatus (for example, the monitoring apparatuses 121 to 123) of the given area 101.

Further, wireless signals transmitted by the nodes of the node group 102 include hop count information that indicates the hop count from the initial transmission source. A hop count is a number that indicates the transfer count of a signal from the initial transmission source of the signal in multi-hop communication and, for example, is a number obtained by adding one to the transfer count from the initial transmission source. When transferring a wireless signal, each node of the node group 102 increments hop count information included in the wireless signal to be transferred. As a result, a nearby wireless communications apparatus of the given area 101, when receiving the wireless signal, can obtain information that indicates the number of hops taken for the received wireless signal to reach the nearby wireless communications apparatus by multi-hop communication.

The node group 102, for example, is arranged in the given area 101 by being interspersed in the given area 101 and/or mixed in matter filling the given area 101. Therefore, the positions of the nodes of the node group 102 are unknown. Further, there is unevenness in the arrangement of the nodes of the node group 102 and in the given area 101, there may be a node-less area 103 in which no node is present. Additionally, a node-less area 103 in which no node is present may occur consequent to an object such as a pillar in the given area 101. For example, the node-less area 103 is an area of a size in which nodes located on opposite sides cannot directly transmit or receive wireless signals with respect to each other since the radio waves do not reach that far.

A given node 104 included in the node group 102 is assumed to have transmitted a wireless signal nearby. For example, the given node 104 transmits a wireless signal that indicates a sensing result of the sensor thereof. The wireless signal transmitted by the given node 104 is transferred by multiple hops while the hop count information is incremented, and is received by the monitoring apparatuses 121 to 123. The monitoring apparatuses 121 to 123 transmit the hop count information of the received wireless signal to the determining apparatus 110.

The determining apparatus 110 is a determining apparatus that determines the position of the given node 104, which is the transmission source of the wireless signal. More specifically, based on the hop count information received from the monitoring apparatuses 121 to 123, the determining apparatus 110 calculates estimated distances between the given node 104 and the monitoring apparatuses 121 to 123. The calculation of the estimated distances based on the hop count information will be described hereinafter (for example, refer to FIG. 10).

The determining apparatus 110 calculates based on the calculated estimated distances, estimated curves 131 to 133 whose respective origins are the monitoring apparatuses 121 to 123. The estimated curve 131, for example, is a curve that represents candidates of an estimated position of the given node 104. For example, the estimated curve 131 is an arc whose center is at the monitoring apparatus 121, and whose radius is the estimated distance between the given node 104 and the monitoring apparatus 121.

Further, the determining apparatus 110 obtains node-less area information that indicates the range of a node-less area 103. Node-less area information, for example, is input to the determining apparatus 110 by a user and stored in the memory of the determining apparatus 110. For example, the user measures the position of the node-less area 103 in the given area 101. The measurement of the position of a node-less area 103, for example, can be performed by using a visual survey, a measuring instrument such as an X ray imaging device, a sonic survey, etc. Further, the node-less area information may be determination results obtained by a determining apparatus 1110 described hereinafter.

Since a node-less area 103 is present between the estimated curve 132 and the monitoring apparatus 122, the determining apparatus 110 corrects the estimated curve 132 based on the node-less area information that indicates the range of the node-less area 103. Correction of an estimated curve based on node-less area information will be described hereinafter (for example, refer to FIG. 2). An estimated curve 132a is the estimated curve resulting from correction of the estimated curve 132. The determining apparatus 110 calculates intersections of the estimated curves 131, 132a, and 133 and thereby, determines the position of the given node 104. As a result, the position of the given node 104, which is the transmission source of the wireless signal, can be determined more accurately.

Figure 2:
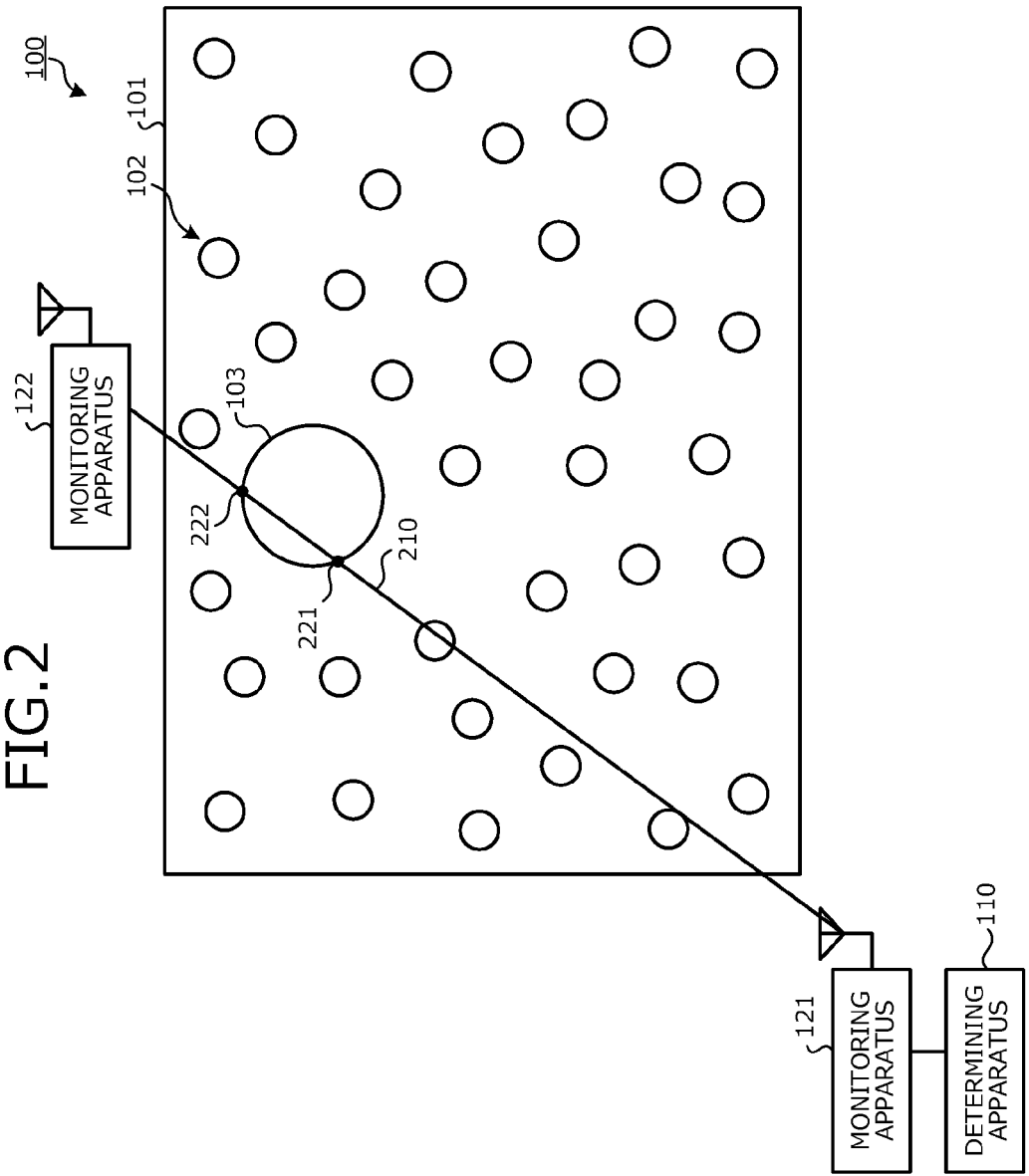
FIG. 2 is a diagram (part 1) depicting an example of estimated curve correction by the determining system.

FIG. 2 is a diagram (part 1) depicting an example of estimated curve correction by the determining system. In FIG. 2, portions identical to those depicted in FIG. 1 are given the same reference numerals used in FIG. 1 and description thereof is omitted. For example, the monitoring apparatus 121 and the monitoring apparatus 122 are assumed to be arranged sandwiching a node-less area 103.

The determining apparatus 110 calculates an effect level per unit length of the node-less area 103, occurring in the estimated distance based on the hop count. More specifically, the determining apparatus 110 causes a survey signal (wireless signal) to be transmitted and received between the monitoring apparatus 121 and the monitoring apparatus 122, via multi-hop communication by the node group 102 and thereby, obtains the hop count of the wireless signal between the monitoring apparatus 121 and the monitoring apparatus 122. The determining apparatus 110 calculates an estimated distance between the monitoring apparatus 121 and the monitoring apparatus 122 based on the obtained hop count. Calculation of an estimated distance based on hop count information will be described hereinafter (for example, refer to FIG. 10).

The determining apparatus 110 obtains distance information, which indicates the actual distance between the monitoring apparatus 121 and the monitoring apparatus 122. The distance information, for example, is stored in advance to the memory of the determining apparatus 110. Alternatively, the determining apparatus 110 may obtain the distance information by calculation based on information that indicates position coordinates of the monitoring apparatuses 121, 122. The position coordinates of the monitoring apparatuses 121, 122, for example, may be stored in advance to the memory of the determining apparatus 110, or may be obtained from the monitoring apparatuses 121, 122.

The determining apparatus 110 calculates the difference of the estimated distance and the actual distance between the monitoring apparatus 121 and the monitoring apparatus 122.

The determining apparatus 110 calculates a straight line connecting the monitoring apparatus 121 and the monitoring apparatus 122. More specifically, the position coordinates of the monitoring apparatuses 121, 122 are assumed to be (x1, y1) and (x2, y2), respectively. The determining apparatus 110 substitutes x1, y1, x2, y2 into $(y2-y1)x+(x2-x1)y+x2y1-x1y2=0$ and thereby, calculates a straight line connecting the monitoring apparatuses 121, 122. In the example depicted in FIG. 2, a line 210 is calculated.

The determining apparatus 110 calculates intersections of the calculated line 210 and the border of the node-less area 103. More specifically, the determining apparatus 110 calculates the solution to a system of equations including an equation representing the line 210 and an equation representing the range of the node-less area 103 and thereby, calculates intersections of the line 210 and the border of the node-less area 103. In the example depicted in FIG. 2, intersections 221, 222 are calculated.

The determining apparatus 110 calculates the distance between the intersections 221, 222. Next, the determining apparatus 110 divides the difference of the estimated distance and the actual distance between the monitoring apparatus 121 and the monitoring apparatus 122, by the distance between the intersections 221, 222. As a result, the effect level per unit length of the node-less area 103, occurring in the estimated distance based on the hop count can be calculated.

Figure 3:
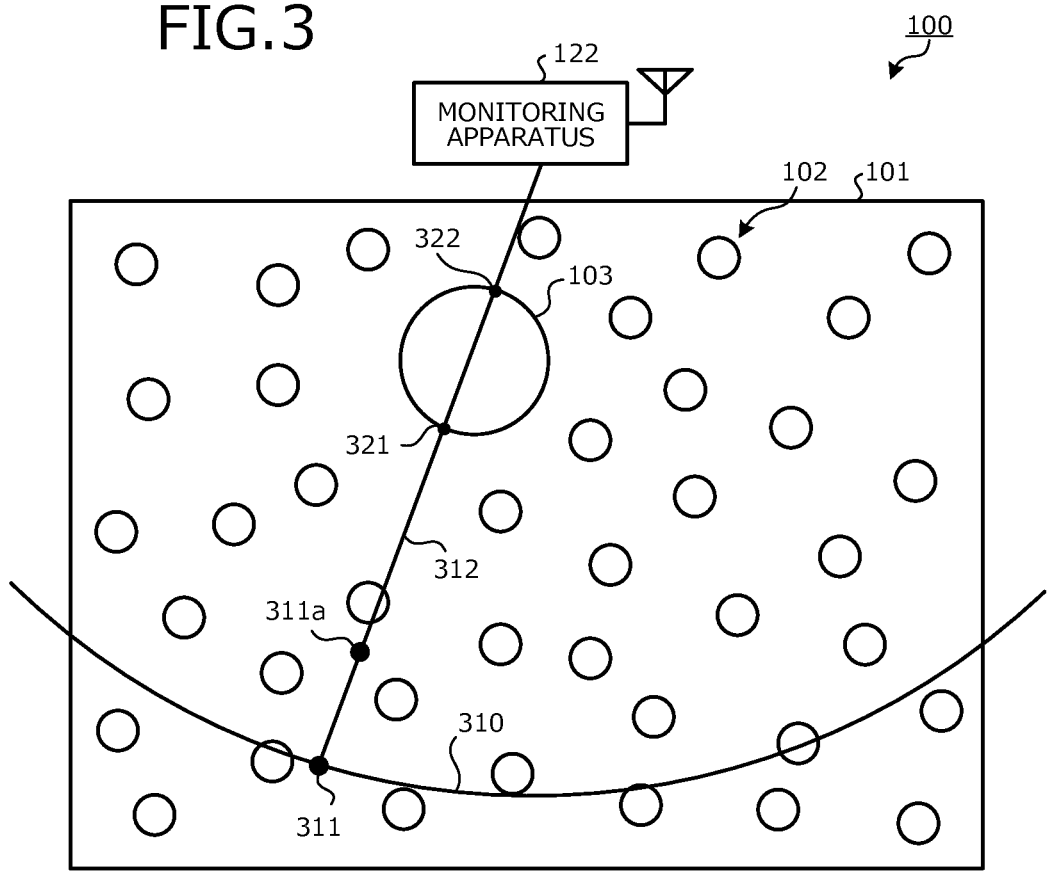
FIG. 3 is a diagram (part 2) depicting an example of estimated curve correction by the determining system.

FIG. 3 is a diagram (part 2) depicting an example of estimated curve correction by the determining system. Next, the determining apparatus 110 calculates an arc whose center is the position coordinates of the monitoring apparatus 122 and whose radius is the estimated distance between the given node 104 and the monitoring apparatus 122 based on the hop count from the given node 104 (refer to FIG. 1). As a result, an estimated curve 310 based on the monitoring apparatus 122 can be calculated.

The determining apparatus 110 judges whether at least a portion of the node-less area 103 is between the position coordinates of the monitoring apparatus 122 and the estimated curve 310. If the node-less area 103 is not between the position coordinates of the monitoring apparatus 122 and the estimated curve 310, the determining apparatus 110 does not correct the estimated curve 310.

If at least a portion of the node-less area 103 is between the position coordinates of the monitoring apparatus 122 and the estimated curve 310, the determining apparatus 110 selects a point 311 on the estimated curve 310, and calculates line 312 connecting the monitoring apparatus 122 and the point 311.

For example, assuming the position coordinates of the monitoring apparatus 122 are (x0, y0), a point (x1, y1) on a circle whose radius is r satisfies $(x1-x0)^2+(y1-y0)^2=r^2$.

Therefore, a straight line passing through the point 311 and the position coordinates (x0, y0) of the monitoring apparatus 122 is $(x-x1)/(x0-x1)=(y-y1)/(y0-y1)$.

If the calculated 312 has a portion that overlaps the node-less area 103, the determining apparatus 110 calculates the distance between intersections 312, 322 of the line 312 and node-less area 103. For example, assuming the position coordinates of the intersections 312, 322 are (x1, y1) and (x2, y2), respectively, then the distance between the intersections is $\sqrt{(x2-x1)^2+(y2-y1)^2}$. As a result, the length of the portion of the line 312 overlapping the node-less area 103 can be calculated.

The determining apparatus 110 multiplies the obtained effect level per unit length of the node-less area 103 and the calculated distance between the intersections 312, 322. As a result, the effect level of the node-less area 103, occurring at the point 311 can be calculated.

The determining apparatus 110 moves the point 311 toward the position coordinates of the monitoring apparatus 122 by the distance of the calculated product. The point 311a is the point that results by moving the point 311 toward the position coordinates of the monitoring apparatus 122 by the calculated product. More specifically, the determining apparatus 110 calculates the point (x, y) for which $(x-x1)/(x0-x1)=(y-y1)/(y0-y1)$ and $(x1-x)^2+(y1-y)^2=$(effect level of node-less area 103 at point 311)$^2$ and thereby, calculates the point 311a. As a result, the point 311 on the estimated curve 310 can be corrected based on the effect level of the node-less area 103.

Figure 4:
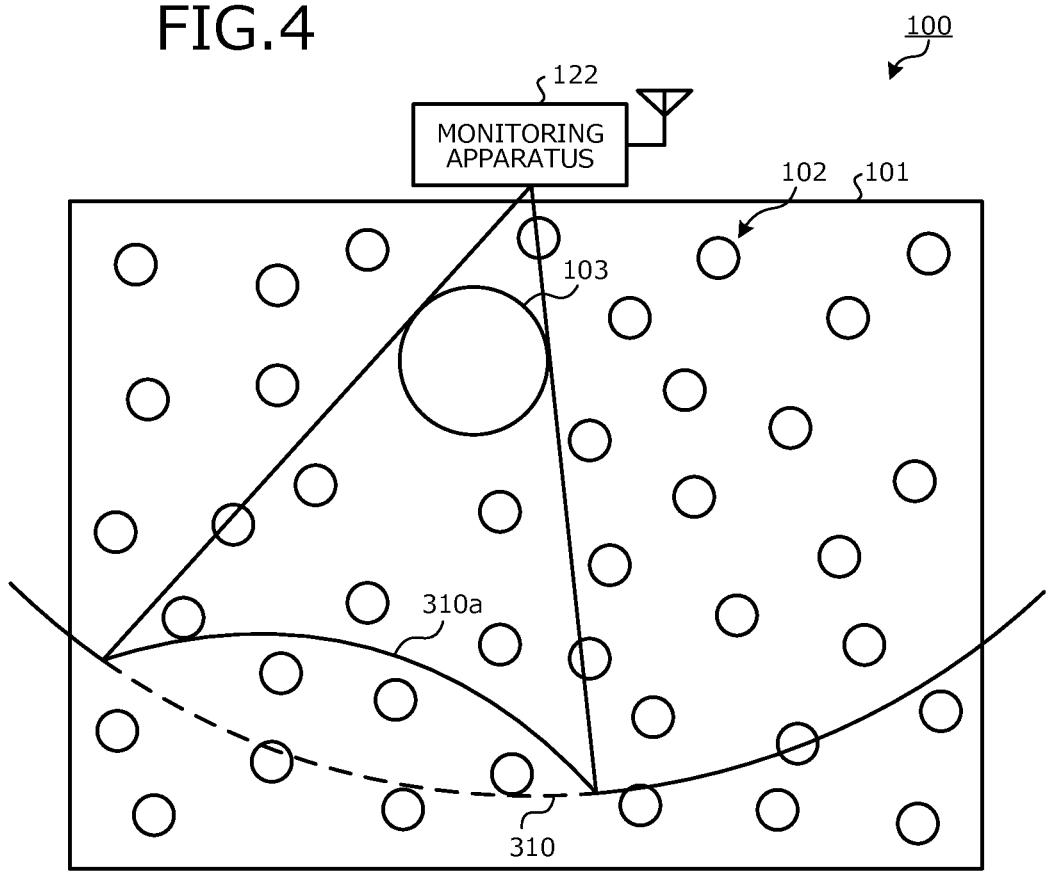
FIG. 4 is a diagram (part 3) depicting an example of estimated curve correction by the determining system.

FIG. 4 is a diagram (part 3) depicting an example of estimated curve correction by the determining system. As depicted in FIG. 4, the determining apparatus 110 performs the correction performed with respect to the point 311 on the estimated curve 310 for other points on the estimated curve 310 and thereby, is able to obtain the estimated curve 310a, which is the estimated curve 310 corrected based on the effect level of the node-less area 103.

Thus, for each point on an estimated curve (estimation line) calculated based on the hop count, if a portion of a straight line connecting a given point and a given monitoring apparatus overlaps a node-less area 103, the determining apparatus 110 calculates the length of the overlapping portion and multiplies the calculated length and a given coefficient. The determining apparatus 110 can correct the estimated curve by changing the given point toward the given monitoring apparatus, based on the multiplication result.

The given coefficient is the effect level per unit length of the node-less area 103. More specifically, the determining apparatus 110 calculates the difference of the actual distance between the monitoring apparatuses 121, 122 (each monitoring apparatus) sandwiching the node-less area 103 and the distance between the monitoring apparatuses 121, 122 estimated based on the hop count of the wireless signal transmitted and received via multi-hop communication by the node group 102. The actual distance between the monitoring apparatuses 121, 122, for example, can be obtained from the distance information stored in advance to the memory of the determining apparatus 110. The determining apparatus 110 calculates the given coefficient by dividing by the length of the portion of the straight line connecting the monitoring apparatuses 121, 122, overlapping the node-less area 103.

Figure 5:
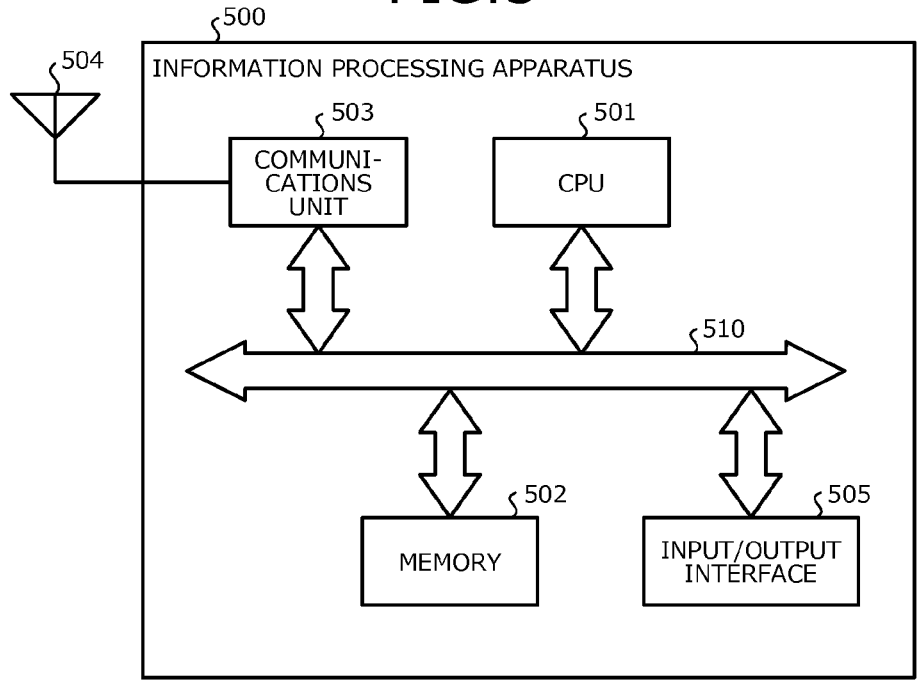
FIG. 5 is a diagram depicting an example of a hardware configuration of a determining apparatus and a monitoring apparatus.

FIG. 5 is a diagram depicting an example of a hardware configuration of the determining apparatus and the monitoring apparatus. The determining apparatus 110 and the monitoring apparatuses 121 to 123 depicted in FIGS. 1 to 3, for example, can be realized by an information processing apparatus 500 depicted in FIG. 5. The determining apparatus 110 and the monitoring apparatuses 121 to 123 may be realized by independent information processing apparatuses 500 or by a single information processing apparatus 500.

The information processing apparatus 500, for example, operates on an external power source. Further, the information processing apparatus 500 includes a central processing unit (CPU) 501, memory 502, a communications unit 503, an antenna 504, an input/output interface 505, and a bus 510. The CPU 501, the memory 502, the communications unit 503, and the input/output interface 505 are connected by the bus 510.

The CPU 501 is a processing apparatus that governs overall control of the information processing apparatus 500. The memory 502, for example, is a storage apparatus that includes main memory and auxiliary memory. The main memory, for example, is random access memory (RAM). The main memory is used as a work area of the CPU 501. The auxiliary memory, for example, is non-volatile memory such as a magnetic disk, an optical disk, flash memory, etc. The auxiliary memory stores various types of programs by which the information processing apparatus 500 operates. Programs stored in the auxiliary memory are loaded to the main memory and executed by the CPU 501.

The communications unit 503 wirelessly communicates with other communications apparatuses, via the antenna 504. For example, the communications unit 503 wirelessly communicates with the determining apparatus 110 and nearby nodes among the node group 102. Communication between the communications unit 503 and the determining apparatus 110 may be by a physical line. The communications unit 503 is controlled by the CPU 501.

The input/output interface 505, for example, includes an input device that receives operational input from the user, and an output device that outputs information to the user, etc. The input device, for example, can be realized by keys (e.g., a keyboard), a remote controller, and the like. The output device, for example, can be realized by a display, a speaker, and the like. Further, the input device and the output device may be realized by a touch panel and the like. The input/output interface 305 is controlled by the CPU 501.

The information processing apparatus 500 receives sensing information from the communications unit 503 and aggregates the sensing information transmitted from the node group 102. The information processing apparatus 500 outputs the aggregated sensing information from the input/output interface 505. The information processing apparatus 500 may transmit the aggregated sensing information by the communications unit 503, through a network such as the Internet, to an external apparatus such as a user terminal and a server.

Figure 6:
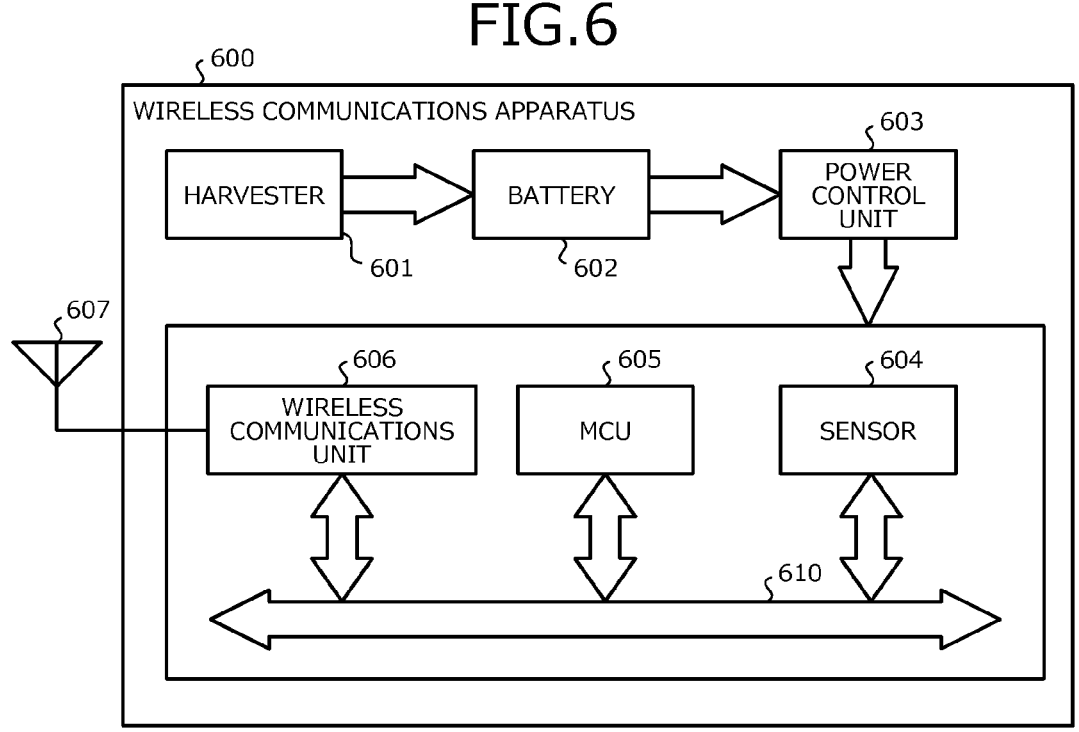
FIG. 6 is a diagram depicting an example of a hardware configuration of a node.

FIG. 6 is a diagram depicting an example of a hardware configuration of a node. The nodes of the node group 102, for example, can be realized by a wireless communications apparatus 600 depicted in FIG. 6. The wireless communications apparatus 600 includes a harvester 601, a battery 602, a power control unit 603, a sensor 604, a micro control unit (MCU) 605, a wireless communications unit 606, an antenna 607, and a bus 610.

The harvester 601 generates power based on the external environment of the installation site of the wireless communications apparatus 600, e.g., energy changes such as changes in light, vibration, temperature, radio waves (received radio waves) and the like. The battery 602 stores power generated by the harvester 601. The power control unit 603 provides the power stored in the battery 602 to components of the wireless communications apparatus 600.

The sensor 604, the MCU 605, and the wireless communications unit 606 are connected by the bus 610. The sensor 604 detects a given displacement at the installation site of the wireless communications apparatus 600. For example, a piezoelectric element that detects voltage at the installation site, a photoelectric element that detects light, and the like can be used as the sensor 604.

The MCU 605 processes data concerning detection by the sensor 604 and transmits the processed data as a wireless signal to the wireless communications unit 606. Further, the MCU 605 performs control to increment the hop count of the hop count information included in the wireless signal received by the wireless communications unit 606, and to transmit to communications apparatuses near the wireless communications apparatus 600, a wireless signal having the hop count information in which the hop count has been incremented.

The wireless communications unit 606, via the antenna 607, wirelessly communicates with communications apparatuses near the wireless communications apparatus 600. The communications apparatuses near the wireless communications apparatus 600, for example, are the monitoring apparatuses 121 to 123, and other nodes of the node group 102.

Figure 7:
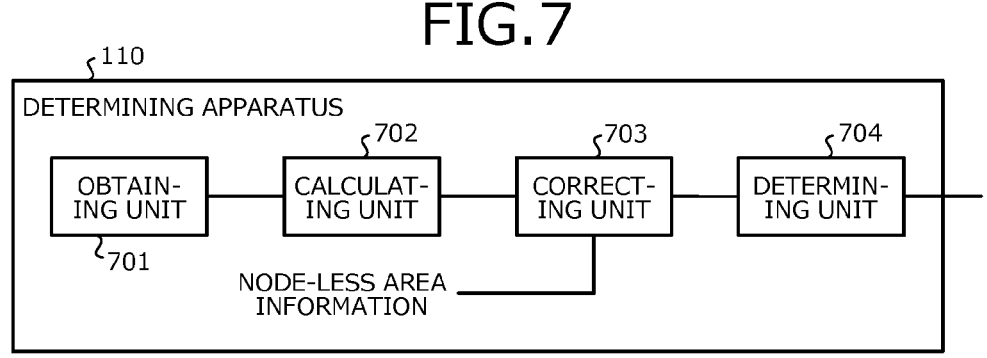
FIG. 7 is a diagram depicting an example of a configuration of the determining apparatus according to the first embodiment.

FIG. 7 is a diagram depicting an example of a configuration of the determining apparatus according to the first embodiment. As depicted in FIG. 7, the determining apparatus 110 according to the first embodiment includes an obtaining unit 701, a calculating unit 702, a correcting unit 703, and a determining unit 704.

The obtaining unit 701 takes each of the monitoring apparatuses 121 to 123 as a target monitoring apparatus, and obtains hop count information indicating the hop count until a wireless signal transmitted from the given node 104 (target wireless communications apparatus) is received by the target monitoring apparatus, via multi-hop communication by the node group 102. The obtaining unit 701 notifies the calculating unit 702 of the hop counts indicated by the obtained hop count information.

The calculating unit 702 takes each of the monitoring apparatuses 121 to 123 as the target monitoring apparatus, and based on the hop count notified by the obtaining unit 701, calculates an estimated distance between the target monitoring apparatus and the given node 104. The calculating unit 702 takes each of the monitoring apparatuses 121 to 123 as the target monitoring apparatus, and based on the calculated estimated distance, calculates an estimated line (estimated curve) that represents candidates of the position of the given node 104. The calculating unit 702 notifies the correcting unit 703 of the calculated estimated curves.

The correcting unit 703 obtains node-less area information that indicates the range of a node-less area 103 that is in the given area 101 and in which no node of the node group 102 is present. The correcting unit 703 takes each of the monitoring apparatuses 121 to 123 as the target monitoring apparatus and based on the obtained node-less area information, corrects the estimated curves notified by the calculating unit 702. The correcting unit 703 notifies the determining unit 704 of the corrected estimated curves.

The determining unit 704 determines the position of the given node 104 based on intersections of the estimated curves notified by the correcting unit 703. The determining unit 704 outputs a determination result.

The obtaining unit 701, for example, can be realized by the CPU 501 and the communications unit 503 depicted in FIG. 5. The calculating unit 702, the correcting unit 703, and the determining unit 704, for example, can be realized by the CPU 501 depicted in FIG. 5. Further, the determination result output from the determining unit 704, for example, can be output to an external destination by the communications unit 503 and/or the input/output interface 505.

Figure 8:
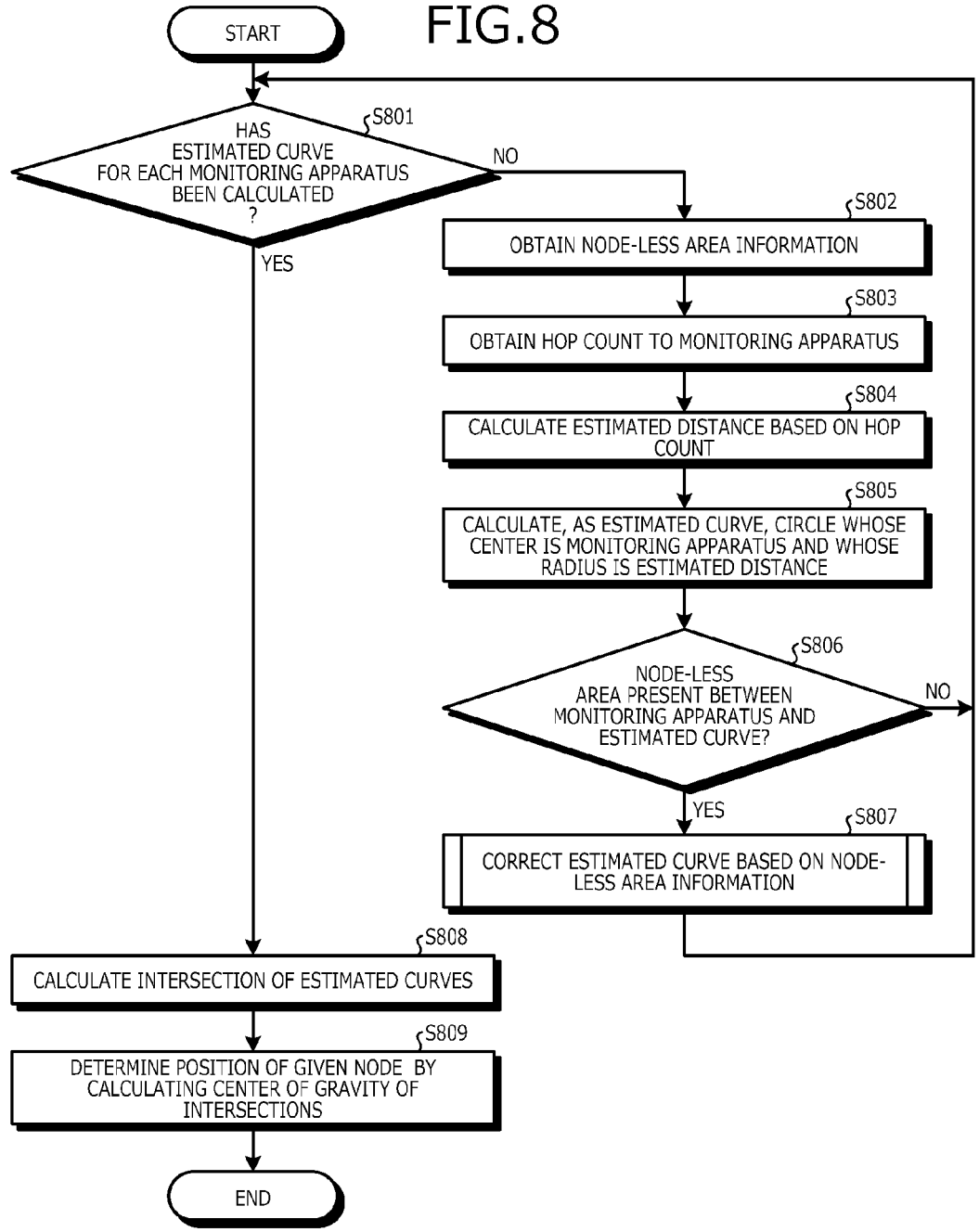
FIG. 8 is a flowchart depicting an example of a determination operation of the determining apparatus according to the first embodiment.

FIG. 8 is a flowchart depicting an example of a determination operation of the determining apparatus according to the first embodiment. The determining apparatus 110 according to the first embodiment, for example, executes the following steps. The determining apparatus 110 judges whether an estimated curve for each monitoring apparatus (the monitoring apparatuses 121 to 123) has been calculated (step S801). If an estimated curve for any one of the monitoring apparatuses has not been calculated (step S801: NO), the determining apparatus 110 obtains node-less area information (step S802). The node-less area information may be obtained before step S801.

The determining apparatus 110 obtains from the given node 104, the hop count of the wireless signal to the monitoring apparatus for which no estimated curve has been calculated (step S803). The determining apparatus 110 calculates an estimated distance between the monitoring apparatus and the given node 104, the estimated distance being based on the hop count obtained at step S803 (step S804).

The determining apparatus 110 calculates as an estimated curve for the monitoring apparatus, a circle whose center is the monitoring apparatus and whose radius is the estimated distance calculated at step S804 (step S805). The determining apparatus 110 judges based on the node-less area information obtained at step S802, whether a node-less area is between the monitoring apparatus and the estimated curve calculated at step S805 (step S806).

At step S806, if no node-less area is present (step S806: NO), the determining apparatus 110 returns to step S801. If a node-less area is present (step S806: YES), the determining apparatus 110 corrects based on the node-less area information obtained at step S802, the estimated curve calculated at step S805 (step S807), and returns to step S801. Correction of the estimated curve will be described hereinafter (for example, refer to FIG. 9).

At step S801, if an estimated curve for each monitoring apparatus has been calculated (step S801: YES), the determining apparatus 110 calculates an intersection of the calculated estimated curves (step S808). The determining apparatus 110 calculates the center of gravity of the intersections calculated at step S808 and thereby, determines the position of the given node (step S809), and ends the series of operations.

Figure 9:
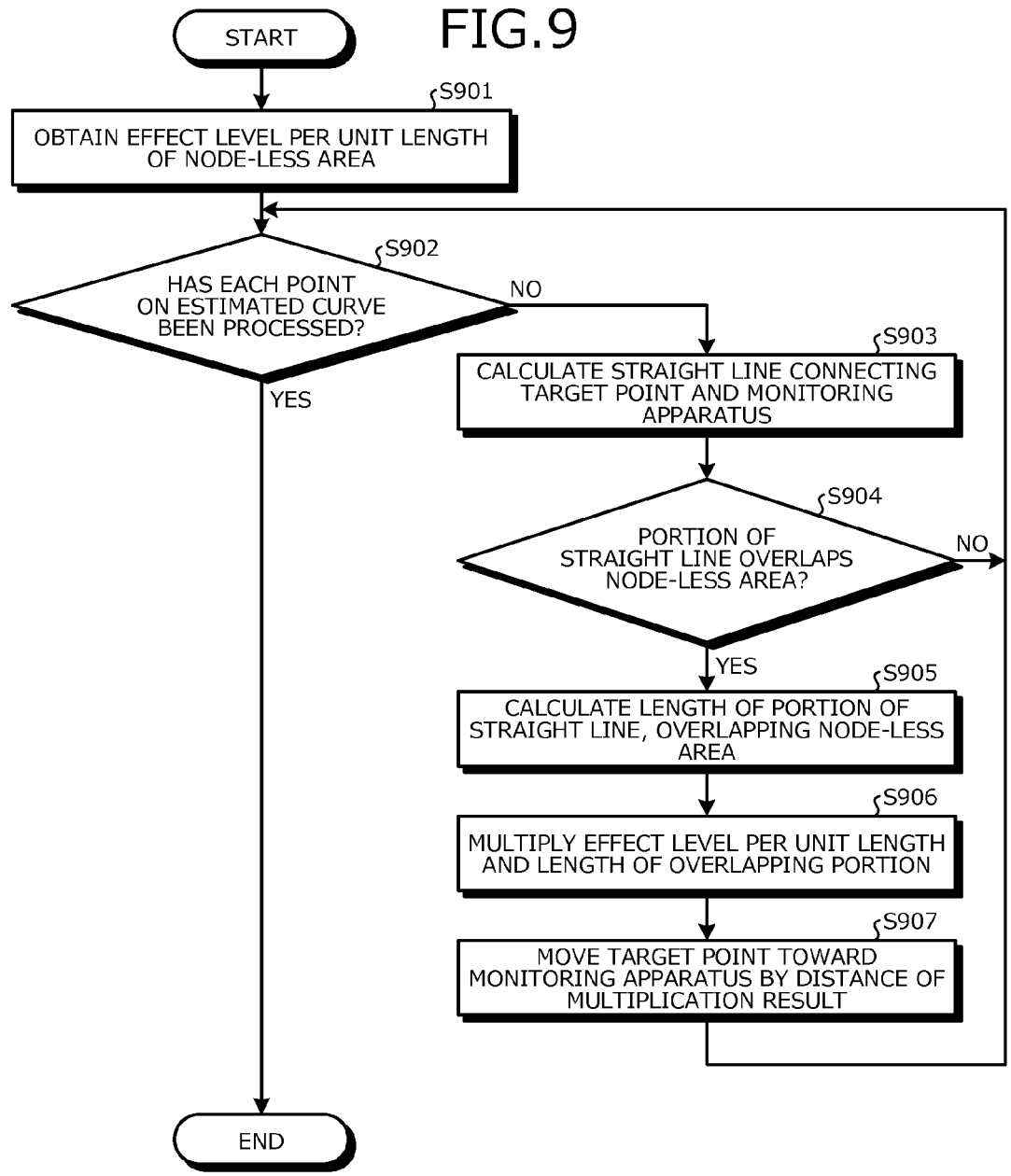
FIG. 9 is a flowchart depicting an example of a correction operation of the determining apparatus according to the first embodiment.

FIG. 9 is a flowchart depicting an example of a correction operation of the determining apparatus according to the first embodiment. The determining apparatus 110, for example, executes the following steps as a correction operation for the estimated curve at step S807 depicted in FIG. 8. The determining apparatus 110 obtains the effect level per unit length of the node-less area indicated by node-less area information (step S901).

The determining apparatus 110 judges whether each point on the estimated curve based on the monitoring apparatus has been processed at step S903 (step S902). If each point on the estimated curve has not been processed (step S902: NO), the determining apparatus 110 takes an unprocessed point among the points on the estimated curve as a target point, and calculates a straight line connecting the target point and the monitoring apparatus (step S903).

The determining apparatus 110 judges based on the node-less area information, whether a portion of the straight line calculated at step S903 overlaps the node-less area (step S904). If no overlapping portion is present (step S904: NO), the determining apparatus 110 returns to step S902. If an overlapping portion is present (step S904: YES), the determining apparatus 110 calculates the length of the portion of the straight line calculated at step S903, overlapping the node-less area (step S905).

The determining apparatus 110 multiplies the effect level per unit length obtained at step S901 and the length of overlapping portion calculated at step S905 (step S906). The determining apparatus 110 moves the target point on the estimated curve for the monitoring apparatus, toward the monitoring apparatus by the distance calculated at step S906 (step S907), and returns to step S902.

At step S902, if each point on the estimated curve has been processed (step S902: YES), the determining apparatus 110 ends the series of correction operations. As a result, the estimated curve can be corrected based on the node-less area information.

Figure 10:
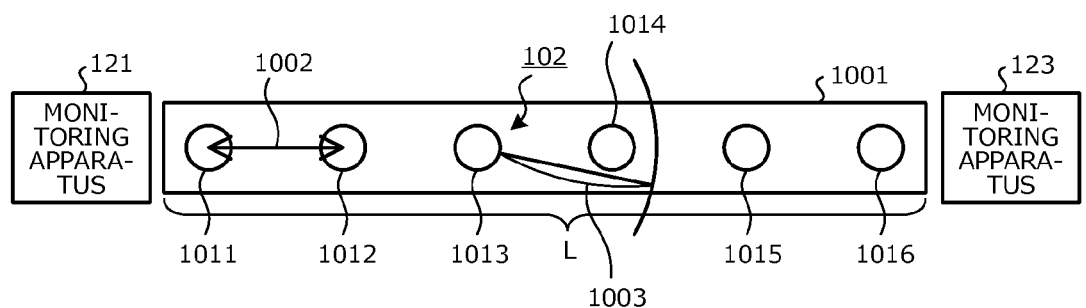
FIG. 10 is a diagram depicting an example of calculation of an estimated distance based on hop count.

FIG. 10 is a diagram depicting an example of calculation of the estimated distance based on hop count. As described, for each combination of monitoring apparatuses included among the monitoring apparatuses 121 to 123, the determining apparatus 110 calculates an estimated distance between the monitoring apparatuses based on the hop count.

FIG. 10 depicts a partial area 1001 that is in the given area 101 and between the monitoring apparatus 121 and the monitoring apparatus 123. Nodes 1011 to 1016 represent nodes of the node group 102, included in the partial area 1001. In FIG. 10, here, the nodes 1011 to 1016 are assumed to be arranged at equal intervals in a straight line.

The determining apparatus 110 obtains an average distance 1002 between the nodes of the node group 102 in the given area 101. For example, the determining apparatus 110 calculates the distance 1002 between the nodes based on the density [nodes/area] of the node group 102 in the given area 101. More specifically, assuming the density of the node group 102 in the given area 101 to be p, the distance 1002 between the nodes can be calculated by $1/\sqrt{\rho}$.

Further, the determining apparatus 110 obtains a reachable distance 1003 of radio waves transmitted by the nodes of the node group 102. The reachable distance 1003 of radio waves, for example, is stored in advance to the memory of the determining apparatus 110.

The determining apparatus 110 can calculate an estimated distance between the monitoring apparatuses by (distance between nodes)×(hop count), when (distance between nodes)(reachable distance of radio wave)<(distance between nodes)×2 is true. Further, the determining apparatus 110 can calculate an estimated distance between the monitoring apparatuses by (distance between nodes)×2×(hop count), when (distance between nodes)×2≤(reachable distance of radio waves)<(distance between nodes)×3 is true.

Similarly, the determining apparatus 110 can calculate an estimated distance between the monitoring apparatuses by (distance between nodes)×n×(hop count), when (distance between nodes)×n≤(reachable distance of radio waves)<

(distance between nodes)×(n+1) is true. In this manner, the determining apparatus 110 calculates the estimated distance based on a product of the distance between nodes of the node group 102, the hop count, and a coefficient corresponding to the reachable distance of the wireless signals transmitted by the nodes of the node group 102. As a result, the estimated distance can be calculated with high accuracy.

Further, when (reachable distance of radio waves)<(distance between nodes) is true, transmitted wireless signals cannot reach other nodes and the configuration fails as a sensor network. In this case, the determining apparatus 110 may output alarm information to the user.

In FIG. 10, although description has been given assuming that the nodes 1011 to 1016 are arranged at equal intervals in a straight line, the distance 1002 between the nodes may be calculated taking into consideration a case where the nodes 1011 to 1016 are not arranged at equal intervals or in a straight line. For example, the determining apparatus 110 calculates the area of the partial area 1001. More specifically, assuming that the actual distance between the monitoring apparatus 121 and the monitoring apparatus 122 is L, a length of the partial area 1001 along a lateral direction is L. Further, a length of the partial area 1001 along a longitudinal direction is assumed to be a length that is 3/2 of the average distance 1002 ($1/\sqrt{\rho}$) between nodes.

In this case, the determining apparatus 110 can calculate the area of the partial area 1001 between the monitoring apparatus 121 and the monitoring apparatus 122 by $L \cdot (1/\sqrt{\rho}) \cdot (2/3)$. Therefore, the determining apparatus 110 can calculate the number of nodes actually in the partial area 1001 by $L \cdot (1/\sqrt{\rho}) \cdot (2/3) \cdot \rho$.

The determining apparatus 110 divides the actual distance L between the monitoring apparatus 121 and the monitoring apparatus 122 by the calculated number of nodes in the partial area 1001. In other words, the determining apparatus 110 calculates $(1/\sqrt{\rho}) \cdot (3/2)$. As a result, distances between nodes can be calculated taking into consideration differences in the distribution of the nodes.

Thus, the determining apparatus 110 according to the first embodiment corrects based on the range of the node-less area 103 in which no node is present, the estimated curves 131 to 133 of node positions based on the hop counts from the given node 104 to the monitoring apparatuses 121 to 123. As a result, even if a node-less area 103 between the given node 104 and any one of the monitoring apparatuses 121 to 123 is present, determination of the position of the given node 104 can be performed accurately.

Figure 11:
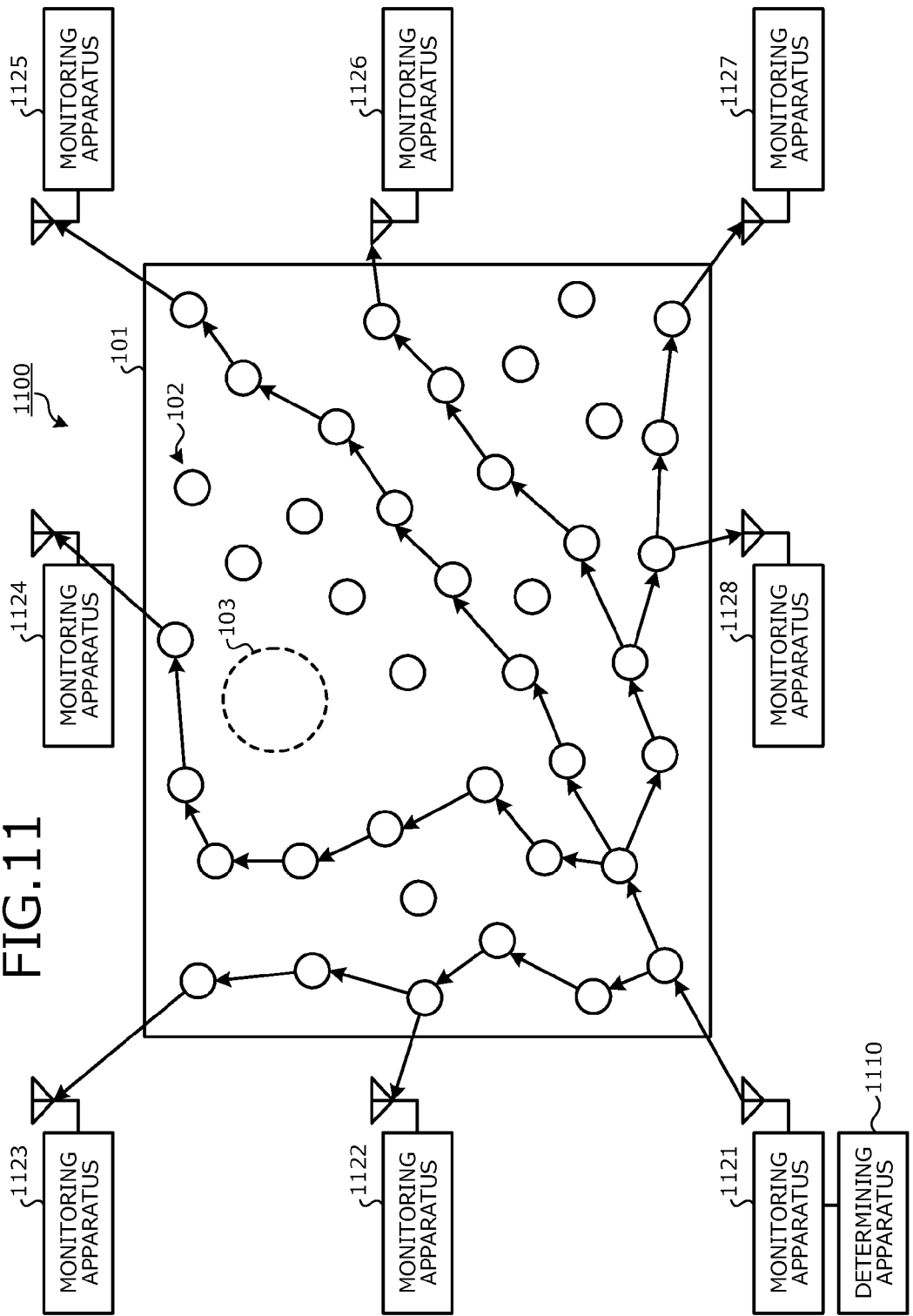
FIG. 11 is a diagram (part 1) depicting an example of determination by the determining system according to a second embodiment.

FIG. 11 is a diagram (part 1) depicting an example of determination by the determining system according to a second embodiment. In FIG. 11, portions identical to those depicted in FIG. 1 are given the same reference numerals used in FIG. 1 and description thereof is omitted. As depicted in FIG. 11, a determining system 1100 according to the second embodiment includes the determining apparatus 1110 and monitoring apparatuses 1121 to 1128. The monitoring apparatuses 1121 to 1128, for example, may include the monitoring apparatuses 121 to 123 depicted in FIG. 1.

The determining apparatus 1110 is an apparatus that can communicate with the monitoring apparatuses 1121 to 1128. Further, the determining apparatus 1110 may be an apparatus provided independently of the monitoring apparatuses 1121 to 1128, or an apparatus provided in any one of the monitoring apparatuses 1121 to 1128. In the example depicted in FIG. 11, the determining apparatus 1110 is provided in the monitoring apparatus 1121.

The monitoring apparatuses 1121 to 1128 are arranged to surround the given area 101. The given area 101 depicted in FIG. 11 is the same as the given area 101 depicted in FIG. 1, where nodes of the node group 102 are interspersed and a node-less area 103 is present in which no node is present.

The determining apparatus 1110 uses the monitoring apparatuses 1121 to 1128 to make a determination concerning the node-less area 103 in the given area 101 and outputs a determination result. The determination concerning the node-less area 103, for example, is the determination of the presence/absence of a node-less area 103. As a result, if a determination result indicating that a node-less area 103 is present in the given area 101 is output from the determining apparatus 1110, the user can eliminate the node-less area 103 by remixing the matter filling the given area 101, etc.

Alternatively, the determination concerning the node-less area 103 may be determination of the position of the node-less area 103, determination of the range of the node-less area 103, etc. As a result, the user can eliminate the node-less area 103 by adding nodes to the node-less area 103 based on the determination of the position, range, etc. of the node-less area 103, output by the determining apparatus 1110.

By eliminating the node-less area 103, the arrangement of the nodes of the node group 102 in the given area 101 can be made more uniform, enabling multi-hop communication of wireless signals to be more efficient. Further, by eliminating the node-less area 103, the accuracy of determining the position of a node based on hop count described hereinafter can be improved. In a case where the range of the node-less area 103 is determined by the determining apparatus 1110, in the determination of the position of a node based on hop count and described hereinafter, correction of the estimated position of the node can be corrected based on the range of the node-less area 103. As a result, the accuracy of the determination of the position of a node can be improved.

As depicted in FIG. 11, under the control of the determining apparatus 1110, the monitoring apparatus 1121 transmits a survey signal to a node among the node group 102 and near the monitoring apparatus 1121. The survey signal is a wireless signal that includes hop count information indicating the hop count from the monitoring apparatus that is the initial transmission source.

The nodes of the node group 102, upon receiving the survey signal, increment the hop count indicated by the hop count information included in the received survey signal, and transmit a survey signal that includes the resulting hop count information to a nearby node. As a result, the survey signal transmitted by the monitoring apparatus 1121 is transferred by multiple hops while the hop count indicated by the hop count information is incremented by the node group 102, and is received by the monitoring apparatuses 1122 to 1128. The monitoring apparatuses 1122 to 1128 transmit to the determining apparatus 1110, the hop count information included in the received survey signal.

For example, the hop count of the survey signal received by the monitoring apparatus 1122 is 4. Further, the hop count of the survey signal received by the monitoring apparatus 1123 is 6. The monitoring apparatuses 1122 to 1128, upon receiving from plural paths, the survey signal transmitted from the monitoring apparatus 1121, transmit the hop count information indicating the smallest hop count among the received survey signals.

For example, the monitoring apparatuses 1122 to 1128 transmit to the determining apparatus 1110, the hop count information of the survey signal transmitted from the monitoring apparatus 1121 and first received. The survey signal having the hop count information indicating the smallest hop count is a survey signal that has been transferred by multiple hops along the shortest path among the plural paths and therefore, the hop count information indicating the smallest hop count can be transmitted to the determining apparatus 1110.

The distances between the monitoring apparatus 1121 and each of the monitoring apparatuses 1122 to 1128 are substantially proportional to the hop counts of the survey signals received by the monitoring apparatuses 1122 to 1128 from the monitoring apparatus 1121. However, since the node-less area 103 is present between the monitoring apparatus 1121 and the monitoring apparatus 1124, the survey signal transmitted from the monitoring apparatus 1121 is diverted away from the node-less area 103 and received by the monitoring apparatus 1124. Consequently, the hop count of the survey signal received by the monitoring apparatus 1124 is 9 and the actual distance between the monitoring apparatus 1121 and the monitoring apparatus 1124 is not proportional to the hop count.

Under the control of the determining apparatus 1110, the monitoring apparatuses 1122 to 1128 also sequentially transmit a survey signal, similar to the monitoring apparatus 1121. The monitoring apparatuses 1121 to 1128 transmit to the determining apparatus 1110, the hop count information included in a survey signal transmitted from another monitoring apparatus and received via multi-hop communication of the node group 102. As a result, the determining apparatus 1110, for each combination of monitoring apparatuses among the monitoring apparatuses 1121 to 1128, can obtain a hop count between the monitoring apparatuses.

Further, the monitoring apparatuses 1121 to 1128, for example, transmit the survey signal at the same transmission power as the nodes of the node group 102. As a result, drops can be prevented in the accuracy of the calculation of the estimated distance based on hop count, such drops being consequent to the reachable distance of the survey signals transmitted by the monitoring apparatuses 1121 to 1128 and the reachable distance of the survey signals transmitted by the nodes of the node group 102 differing.

The determining apparatus 1110, for each combination of monitoring apparatuses included among the monitoring apparatuses 1121 to 1128, obtains distance information indicating the actual distance between the monitoring apparatuses. The distance information, for example, is stored in advance to the memory of the determining apparatus 1110. Alternatively, the determining apparatus 1110 may obtain the distance information by calculation based on information that indicates the position coordinates of the monitoring apparatuses 1121 to 1128. The position coordinates of the monitoring apparatuses 1121 to 1128, for example, may be stored in advance to the memory of the determining apparatus 1110, or may be obtained from the monitoring apparatuses 1121 to 1128.

Based on the obtained hop counts, the determining apparatus 1110 calculates for each combination of monitoring apparatuses included among the monitoring apparatuses 1121 to 1128, an estimated distance between the monitoring apparatuses. Calculation of estimated distances based on hop count is described above (for example, refer to FIG. 10).

Figure 12:
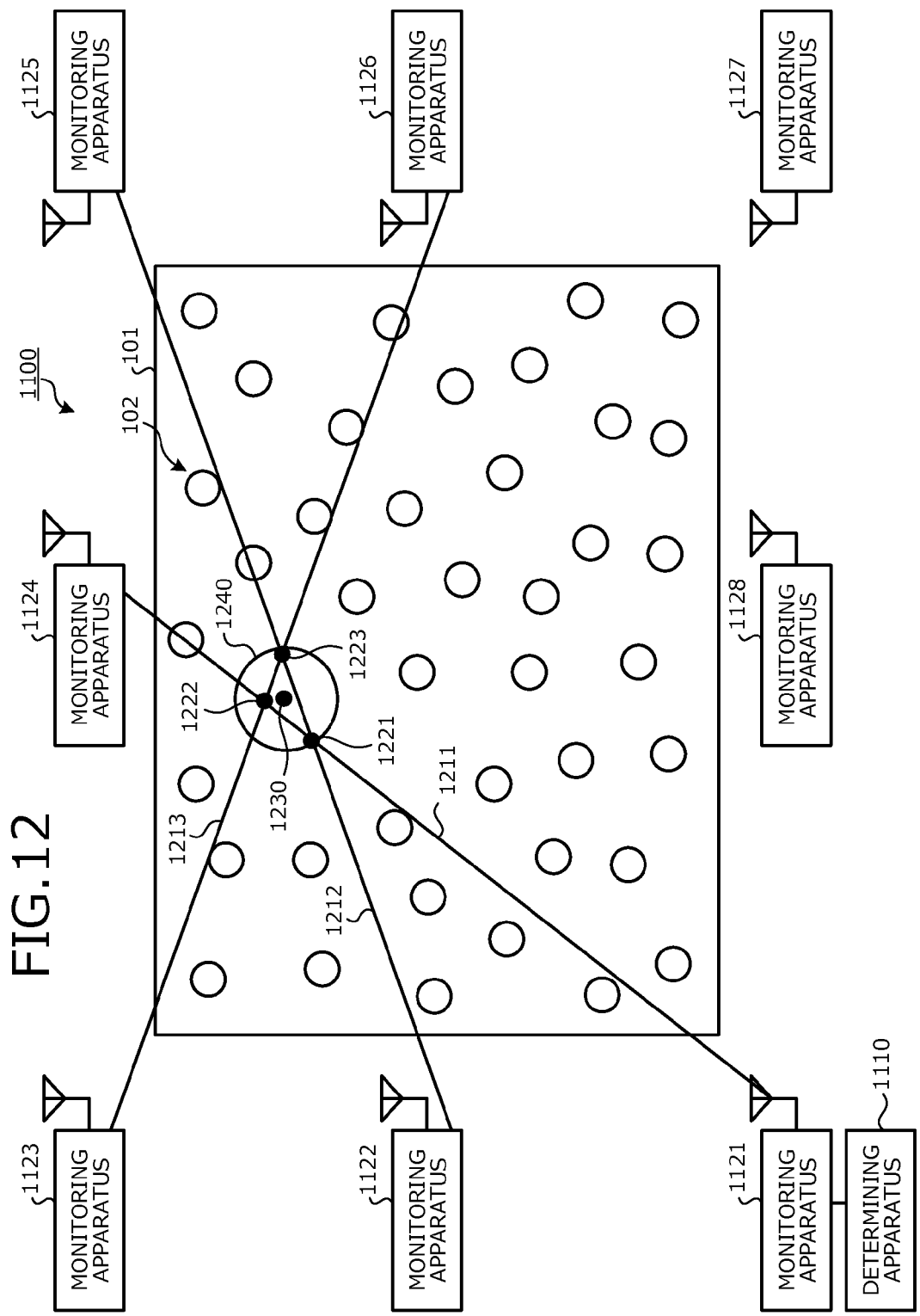
FIG. 12 is a diagram (part 2) depicting an example of determination by the determining system according to the second embodiment.

FIG. 12 is a diagram (part 2) depicting an example of determination by the determining system according to the second embodiment. In FIG. 12, portions identical to those depicted in FIG. 11 are given the same reference numerals used in FIG. 11 and description thereof is omitted. The determining apparatus 1110, for each combination of monitoring apparatuses included among the monitoring apparatuses 1121 to 1128, calculates the difference of the calculated estimated distance and the obtained actual distance.

The determining apparatus 1110 extracts from among the combinations of monitoring apparatuses included among the monitoring apparatuses 1121 to 1128, a combination for which the calculated difference is a given value or greater. As a result, from among the combinations of monitoring apparatuses included among the monitoring apparatuses 1121 to 1128, a combination of monitoring apparatuses between which a node-less area 103 is present can be extracted. In the example depicted in FIG. 12, the combination of the monitoring apparatuses 1121, 1124; the combination of the monitoring apparatuses 1122, 1125; and the combination of the monitoring apparatuses 1123, 1126 are assumed to be extracted.

As depicted in FIG. 12, for each extracted combination of monitoring apparatuses, the determining apparatus 1110 calculates a straight line connecting the monitoring apparatuses. More specifically, the position coordinates of the monitoring apparatuses are assumed to be (x1, y1) and (x2, y2), respectively. The position coordinates of the monitoring apparatuses, for example, are stored in advance to the memory of the determining apparatus 1110. The determining apparatus 1110 substitutes x1, y1, x2, y2 into (y2−y1)x+(x2−x1)y+x2y1−x1y2=0 and can thereby, calculate a straight line connecting the monitoring apparatuses. In the example depicted in FIG. 12, lines 1211 to 1213 are calculated.

Next, the determining apparatus 1110 calculates intersections of the calculated lines 1211 to 1213. More specifically, the determining apparatus 1110 calculates the solution to a system of equations of the lines 1211 to 1213 and thereby, calculates the intersections of the lines 1211 to 1213. In the example depicted in FIG. 12, intersections 1221 to 1223 are calculated.

The determining apparatus 1110 calculates the center of gravity of the calculated intersections 1221 to 1223. More specifically, position coordinates of the intersections are assumed to be (x1, y1), (x2, y2), . . . , (xm, ym). In this case, the determining apparatus 1110 can calculate the position coordinates of the center of gravity by ((x1+x2+ . . . +xm)/m,(y1+y2+ . . . +ym)/m). In the example depicted in FIG. 12, m=3, and the center of gravity 1230 is calculated.

The determining apparatus 1110 determines that a range encompassed by a circle 240 that includes the calculated intersections 1221 to 1223 and whose center that is at the calculated center of gravity 1230 is a node-less area 103. For example, the determining apparatus 1110 calculates the distance between the center of gravity 1230 and each of the intersections 1221 to 1223. More specifically, the position coordinates of the center of gravity and the position coordinates of an intersection are assumed to be (x1, y1) and (x2, y2). In this case, the determining apparatus 1110 can calculate the distance between the center of gravity and the intersection by $\sqrt{((x2-x1)^2+(y2-y1)^2)}$.

The determining apparatus 1110, in $(x-x1)^2+(y-y1)^2=r^2$, substitutes the position coordinates of the center of gravity 1230 (x1, y1) for x1, y1, and substitutes the greatest distance between the center of gravity 1230 and each of the intersections 1221 to 1223 for r. As a result, the circle 240 that has a center at the calculated center of gravity 1230 and that includes the calculated intersections 1221 to 1223 can be calculated. The determining apparatus 1110, for example, outputs the circle 240 as a determination result.

The determining apparatus 1110 and the monitoring apparatuses 1121 to 1128, for example, can be realized by the information processing apparatus 500 depicted in FIG. 5.

The determining apparatus 1110 and the monitoring apparatuses 1121 to 1128 may be realized by independent information processing apparatuses 500 or by a single the information processing apparatus 500. Further, the determining apparatus 110 according to the first embodiment and the determining apparatus 1110 according to the second embodiment may be realized by a single information processing apparatus 500.

Figure 13:
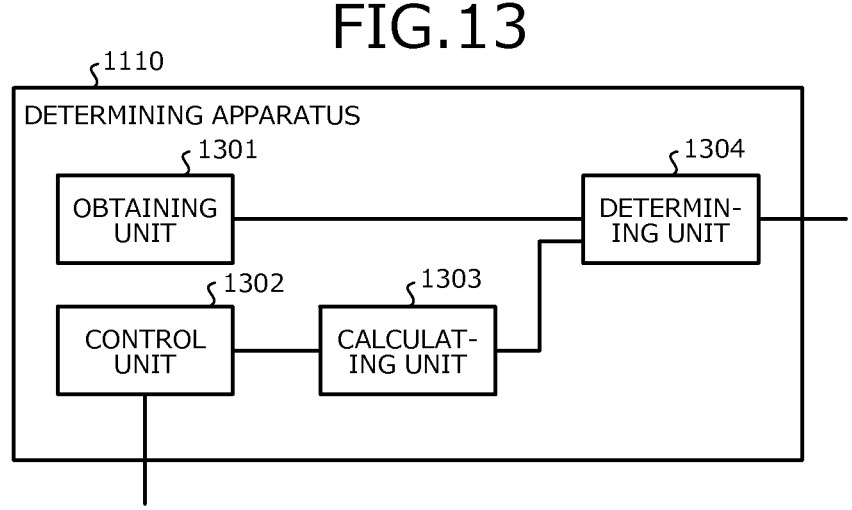
FIG. 13 is a diagram depicting an example of the determining apparatus according to the second embodiment.

FIG. 13 is a diagram depicting an example of the determining apparatus according to the second embodiment. As depicted in FIG. 13, the determining apparatus 1110 according to the second embodiment, for example, includes an obtaining unit 1301, a control unit 1302, a calculating unit 1303, and a determining unit 1304. The obtaining unit 1301, for each combination of monitoring apparatuses included among the monitoring apparatuses 1121 to 1128, obtains distance information that indicates the actual distance between the monitoring apparatuses. The obtaining unit 1301 notifies the determining unit 1304 of the distance indicated by the obtained distance information.

The control unit 1302, by communicating with the monitoring apparatuses 1121 to 1128, controls the monitoring apparatuses 1121 to 1128. The control unit 1302 causes survey signals to be transmitted and received between the monitoring apparatuses 1121 to 1128, via multi-hop communication by the node group 102. Further, the control unit 1302 obtains from the monitoring apparatuses 1121 to 1128, hop count information of the transmitted and received survey signals. The control unit 1302 notifies the calculating unit 1303 of the hop counts indicated by the obtained hop count information.

Based on the hop counts notified by the control unit 1302, the calculating unit 1303 calculates for each combination of monitoring apparatuses included among the monitoring apparatuses 1121 to 1128, an estimated distance between monitoring apparatuses. The calculating unit 1303 notifies the determining unit 1304 of the calculated estimated distances.

Based on a comparison of each distance notified by the obtaining unit 1301 and each estimated distance notified by the calculating unit 1303, the determining unit 1304 determines the node-less area 103 in which no wireless communications apparatus of the node group 102 in the given area 101 is present. The determining unit 1304 outputs a determination result.

The obtaining unit 1301, for example, can be realized by the CPU 501 and the memory 502 depicted in FIG. 5. The control unit 1302, for example, can be realized by the CPU 501 and the communications unit 503 depicted in FIG. 5. The calculating unit 1303 and the determining unit 1304, for example, can be realized by the CPU 501 depicted in FIG. 5. Further, the determination result output from the determining unit 1304, for example, is output to an external destination by the communications unit 503 and/or the input/output interface 505.

Figure 14:
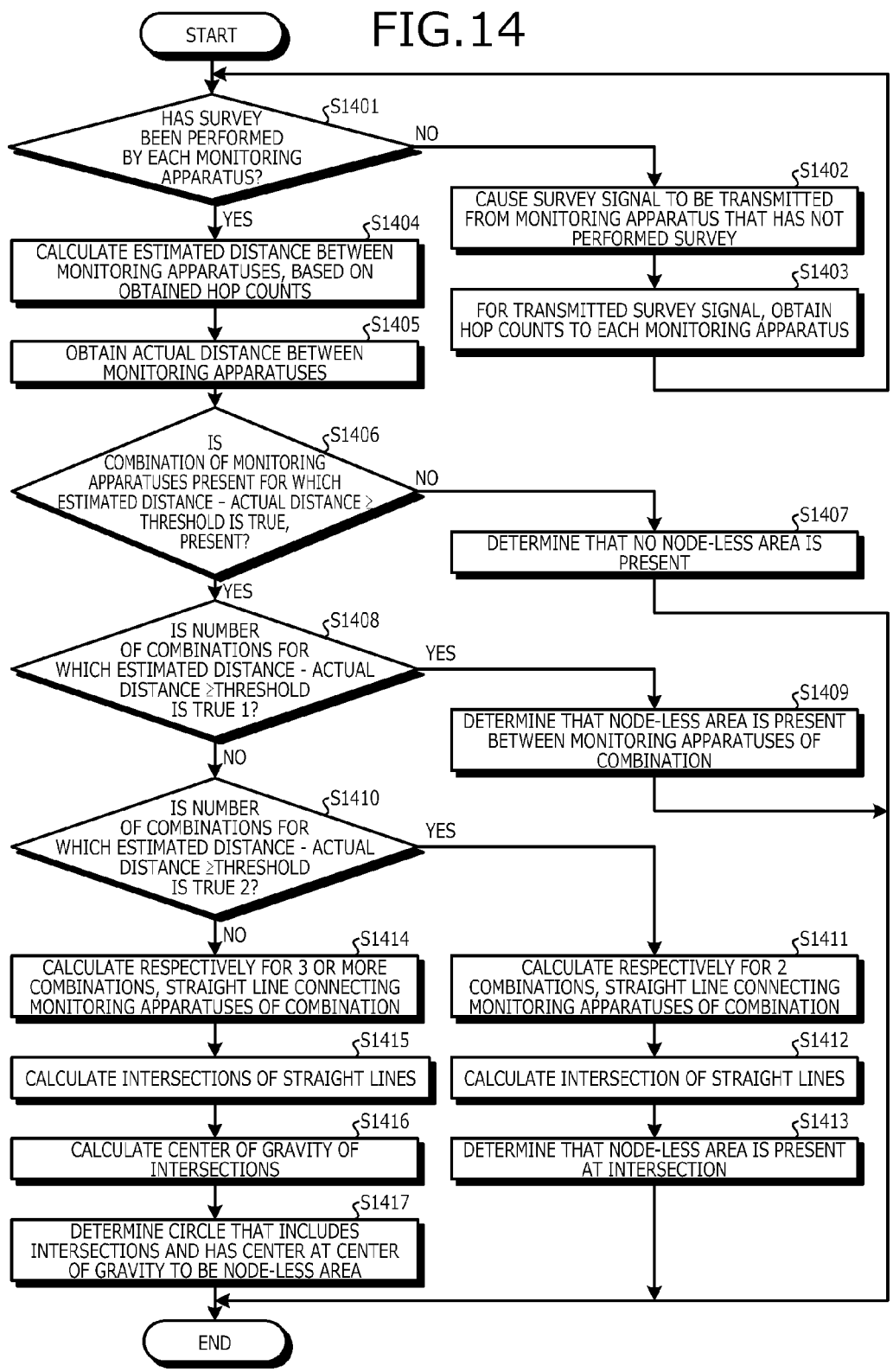
FIG. 14 is a flowchart depicting an example of operation of the determining apparatus according to the second embodiment.

FIG. 14 is a flowchart depicting an example of operation of the determining apparatus according to the second embodiment. The determining apparatus 1110 according to the second embodiment, for example, executes the following steps. The determining apparatus 1110 determines whether a survey has been performed by each monitoring apparatus (the monitoring apparatuses 1121 to 1128) (step S1401). If a survey has not been performed by each monitoring apparatus (step S1401: NO), the determining apparatus 1110 causes a survey signal to be transmitted from any one of the monitoring apparatuses that has not performed a survey, among the monitoring apparatuses 1121 to 1128 (step S1402).

The determining apparatus 1110 obtains a hop count to each monitoring apparatus, for the survey signal transmitted at step S1402 (step S1403), and returns to step S1401. More specifically, at step S1403, the determining apparatus 1110 obtains the hop count information included in the survey signal received from a monitoring apparatus that is among the monitoring apparatuses 1121 to 1128 and exclusive of the monitoring apparatus caused to transmit the survey signal at step S1402.

At step S1401, if a survey has been performed by each monitoring apparatus (step S1401: YES), the determining apparatus 1110 calculates an estimated distance between the monitoring apparatuses, based on the hop counts obtained at step S1403 (step S1404). Further, the determining apparatus 1110 obtains the actual distance between the monitoring apparatuses (step S1405).

The determining apparatus 1110 determines whether a combination of monitoring apparatuses is present for which the difference of the estimated distance calculated at step S1404 and the actual distance obtained at step S1405 is a threshold or greater (step S1406). The threshold, for example, is stored in advance to the memory of the determining apparatus 1110. If no combination is present for which the difference of the estimated distance and the actual distance is the threshold or greater (step S1406: NO), the determining apparatus 1110 determines that no node-less area is in the given area 101 (step S1407), and ends the series of operations.

At step S1406, if a combination is present for which the difference of the estimated distance and the actual distance is the threshold or greater (step S1406: YES), the determining apparatus 1110 judges whether the number of combinations for which the difference of the estimated distance and the actual distance is the threshold or greater is 1 (step S1408). If the number of combinations for which the difference of the estimated distance and the actual distance is the threshold or greater is 1 (step S1408: YES), the determining apparatus 1110 determines that a node-less area is present between the combination of monitoring apparatuses for which difference of the estimated distance and the actual distance is the threshold or greater (step S1409), and ends the series of operations.

At step S1408, if the number of combinations for which the difference of the estimated distance and the actual distance is the threshold or greater is not 1 (step S1408: NO), the determining apparatus 1110 judges whether the number of combinations for which the difference of the estimated distance and the actual distance is the threshold or greater is 2 (step S1410). If the number of combinations for which the difference of the estimated distance and the actual distance is the threshold or greater is 2 (step S1410: YES), the determining apparatus 1110 calculates for each of the two combinations for which the difference of the estimated distance and the actual distance is the threshold or greater, a straight line connecting the monitoring apparatuses (step S1411).

The determining apparatus 1110 calculates an intersection of the straight lines calculated at step S1411 (step S1412). The determining apparatus 1110 judges that a node-less area is present at the intersection calculated at step S1412 (step S1413), and ends the series of operations.

At step S1410, if the number of combinations for which the difference of the estimated distance and the actual distance is the threshold or greater is 3 or more (step S1410:

NO), the determining apparatus 1110 transitions to step S1414. In other words, the determining apparatus 1110 calculates for each of the three or more combinations for which the difference of the estimated distance and the actual distance is the threshold or greater, a straight line connecting the monitoring apparatuses (step S1414).

The determining apparatus 1110 calculates intersections of the straight lines calculated at step S1414 (step S1415). The determining apparatus 1110 calculates the center of gravity of the intersections calculated at step S1415 (step S1416). The determining apparatus 1110 determines a circle that includes the intersections calculated at step S1415 and whose center is the center of gravity calculated at step S1416 to be a node-less area (step S1417), and ends the series of operations.

FIG. 15 is a sequence diagram depicting an example of a monitoring operation of the hop count by the determining system. For example, the determining apparatus 1110 is provided in the monitoring apparatus 1121 whereby, the monitoring apparatus 1121 is a master, the monitoring apparatuses 1122 to 1128 are slaves, and the monitoring operation is performed.

The monitoring apparatus 1121 transmits to the monitoring apparatuses 1122 to 1128, a notification request signal requesting notification of the hop count (step S1501). The monitoring apparatus 1121 wirelessly transmits a survey signal to a nearby node of the monitoring apparatus 1121, among the node group 102 (step S1502). As a result, the survey signal transmitted by the monitoring apparatus 1121 is transferred by multiple hops among the node group 102 and is received by the monitoring apparatuses 1122 to 1128.

The monitoring apparatuses 1122 to 1128 notify the monitoring apparatus 1121 of the hop count of the received survey signal (step S1503). As a result, the monitoring apparatus 1121 can obtain the hop counts between the monitoring apparatus 1121 and each of the monitoring apparatuses 1122 to 1128.

The monitoring apparatus 1121 transmits to the monitoring apparatus 1122, a survey request signal requesting that a survey be performed (step S1504). The monitoring apparatus 1122 transmits to the monitoring apparatuses 1121, 1123 to 1128, a notification request signal requesting notification of the hop count (step S1505). The monitoring apparatus 1122 wirelessly transmits a survey signal to a nearby node of the monitoring apparatus 1122, among the node group 102 (step S1506). As a result, the survey signal transmitted by the monitoring apparatus 1122 is transferred by multiple hops among the node group 102 and is received by the monitoring apparatuses 1121, 1123 to 1128.

The monitoring apparatuses 1121, 1123 to 1128 notify the monitoring apparatus 1122 of the hop count of the received survey signal (step S1507). The monitoring apparatus 1122 notifies the monitoring apparatus 1121 of the hop counts notified at step S1507 (step S1508). As a result, the monitoring apparatus 1121 can obtain the hop counts between the monitoring apparatus 1122 and each of the monitoring apparatuses 1121, 1123 to 1128.

The monitoring apparatus 1121, similar to the monitoring apparatus 1122, further transmits a survey request signal the monitoring apparatus 1123 to 1127, thereby causing surveys to be performed to acquire hop counts.

The monitoring apparatus 1121 transmits to the monitoring apparatus 1128, a survey request signal requesting that a survey be performed (step S1509). The monitoring apparatus 1128 transmits to the monitoring apparatuses 1121 to 1127, a notification request signal requesting notification of the hop count (step S1510). The monitoring apparatus 1128 wirelessly transmits a survey signal to a nearby node of the monitoring apparatus 1128, among the node group 102 (step S1511). As a result, the survey signal transmitted by the monitoring apparatus 1128 is transferred by multiple hops among the node group 102 and is received by the monitoring apparatuses 1121 to 1127.

The monitoring apparatuses 1121 to 1127 notify the monitoring apparatus 1128 of the hop count of the received survey signal (step S1512). The monitoring apparatus 1128 notifies the monitoring apparatus 1121 of the hop counts notified at step S1512 (step S1513). As a result, the monitoring apparatus 1121 can obtain the hop counts between the monitoring apparatus 1128 and each of the monitoring apparatuses 1121 to 1127.

Further, before the monitoring operation depicted in FIG. 15, the nodes of the node group 102 may be charged. Charging of the nodes of the node group 102, for example, can be performed according to the type of the harvester 601 depicted in FIG. 6. For example, if the harvester 601 generates electrical power from ambient radio waves, the nodes of the node group 102 can be charged by providing to the given area 101, radio waves for charging the nodes.

As a result, the nodes of the node group 102 can more assuredly and at the same power, transmit a survey signal; and therefore, the actual distance between the monitoring apparatuses and the hop count of the survey signal become proportional. Consequently, a more accurate estimated distance between the monitoring apparatuses can be calculated. The charging of the nodes of the node group 102, for example, can be performed by the determining apparatus 1110.

Thus, the determining apparatus 1110 according to the second embodiment calculates an estimated distance between monitoring apparatuses based on the hop count of a wireless signal transmitted and received, through the node group 102, by the monitoring apparatuses 1121 to 1128 near the node group 102. The determining apparatus 1110 compares the estimated distance and the actual distance and thereby, can determine the node-less area 103.

Further, by using the monitoring apparatuses 1121 to 1128 near the given area 101 and the node group 102 interspersed in the given area 101, for example, the node-less area 103 can be determined more easily that by using a visual survey, a measuring instrument such as an X ray imaging device, a sonic survey, etc.

For example, in the determining system 1100 depicted in FIGS. 11 and 12, although a case has been described in which 8 monitoring apparatuses (the monitoring apparatuses 1121 to 1128) are used in the determination of the node-less area 103, the number of monitoring apparatuses suffices to be 2 or more. For example, by using 2 or more monitoring apparatus, 1 or more combinations of monitoring apparatuses for which the difference of the estimated distance and the actual distance is a threshold or greater can be extracted. Therefore, the presence/absence of the node-less area 103 and the position of the node-less area 103 can be determined. Further, for example, by using 4 or more monitoring apparatuses, the position coordinates where the node-less area 103 is present can be calculated and therefore, the position of the node-less area 103 can be determined.

By combining the first and the second embodiments, a determining apparatus is realized that can determine the node-less area 103, and determine the position of the given node 104 based on the determination results for the node-less area 103 and hop counts.

The determining method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

In each of the embodiments described, although a configuration has been described that determines position based on 2-dimensional position coordinates, the configuration may be one that determines position based on 3-dimensional position coordinates. For example, a straight line passing through two 3-dimensional position coordinates $(x1, y1, z1)$, $(x2, y2, z2)$ can be calculated by $(x-x1)/(x2-x1)=(y-y1)/(y2-y1)=(z-z1)/(z2-z1)$.

Further, the center of gravity of three or more 3-dimensional position coordinates $(x1, y1, z1), (x2, y2, z2), \ldots, (xm, ym, zm)$ can be calculated by $((x1+x2+\ldots+xm)/m, (y1+y2+\ldots+ym)/m, (z1+z2+\ldots+zm)/m)$.

The distance between two 3-dimensional position coordinates $(x1,y1,z1)$, $(x2, y2, z2)$ can be calculated by $\sqrt{((x2=x1)^2+(y2-y1)^2+(z2-z1)^2)}$.

A sphere whose center is at the 3-dimensional position coordinates $(x1, y1, z1)$ and whose radius is r, can be calculated by $(x-x1)^2+(y-y1)^2+(z-z1)^2=r^2$.

Further, a point $(x1, y1, z1)$ on the surface of the sphere whose center is at the 3-dimensional position coordinates $(x0, y0, z0)$ and whose radius is r, can be calculated by $(x1-x0)^2+(y1-y0)^2+(z1-z0)^2=r^2$. A straight line passing through the point $(x1, y1, z1)$ on the surface of the sphere and the center of the sphere $(x0, y0, z0)$ can be calculated by $(x-x1)/(x0-x1)=(y-y1)/(y0-y1)=(z-z1)/(z0-z1)$.

A point that results by moving the 3-dimensional position coordinates $(x1, y1, z1)$ a given distance can be calculated by calculating a point $(x, y, z)$ that is $(x-x1)/(x0-x1)=(y-y1)/(y0-y1)=(z-z1)/(z0-z1)$ and $(x1-x)^2+(y1-y)^2+(z1-z)^2=(given\ distance)^2$.

Further, the distance between nodes in the given area 101 can be calculated based on the density [node/area] of the node group 102 in the given area 101. For example, the distance between nodes in the given area 101 can be calculated by $1/\rho^{1/3}$, where $\rho$ is the density of the node group 102 in the given area 101.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A determining method comprising:
   obtaining by each monitoring apparatus among a plurality of monitoring apparatuses disposed encompassing a given area having a plurality of wireless communications apparatuses, hop count information that indicates a hop count of a wireless signal transmitted by one wireless communications apparatus among the plurality of wireless communications apparatuses and received by the monitoring apparatus via multi-hop communication by the plurality of wireless communications apparatuses;
   calculating by each monitoring apparatus among the plurality of monitoring apparatuses, an estimated line that represents candidates of a position of the one wireless communications apparatus, the estimated line being calculated from an estimated distance between the monitoring apparatus and the one wireless communications apparatus, based on the hop count indicated by the obtained hop count information;
   correcting by each monitoring apparatus among the plurality of monitoring apparatuses, the calculated estimated line based on information indicating a node-less area in which no wireless communications apparatus of the given area is present; and
   determining the position of the one wireless communications apparatus based on intersections of the corrected estimated lines.

2. The determining method according to claim 1, wherein the correcting of the estimated line includes for each point on the estimated line and when a straight line connecting the point and the monitoring apparatus has a portion that overlaps the node-less area, calculating a length of the portion that overlaps, multiplying the calculated length and a given coefficient, and correcting the estimated line by changing the point in a direction toward the monitoring apparatus, based on a product of the multiplication.

3. The determining method according to claim 2, wherein the given coefficient is calculated by dividing a difference of a distance between monitoring apparatuses that are among the plurality of monitoring apparatuses and sandwich the node-less area and the estimated distance that is based on the hop count of the wireless signal transmitted and received between the monitoring apparatuses via multi-hop communication by the plurality of wireless communications apparatuses, by the length of the portion of the straight line connecting the monitoring apparatuses, the portion overlapping the node-less area.

4. The determining method according to claim 1, wherein the estimated distance is calculated based on the hop count and an inter-apparatus distance of the plurality of wireless communications apparatuses, the inter-apparatus distance being calculated from a density of the plurality of the wireless communications apparatuses in the given area.

5. The determining method according to claim 4, wherein the estimated distance is calculated based on a product of the inter-apparatus distance, the hop count, and a coefficient that corresponds to a reachable distance of wireless signals transmitted by the plurality of wireless communications apparatuses.

6. The determining method according to claim 1, wherein the calculating of the estimated line from the estimated distance includes calculating the estimated line to indicate positions whose distance in the given area and from the monitoring apparatus is the estimated distance.

7. A non-transitory, computer-readable recording medium storing therein a determining program that causes a computer to execute a process comprising:
   obtaining by each monitoring apparatus among a plurality of monitoring apparatuses disposed encompassing a given area having a plurality of wireless communications apparatuses, hop count information that indicates a hop count of a wireless signal transmitted by one wireless communications apparatus among the plurality of wireless communications apparatuses and received by the monitoring apparatus via multi-hop communication by the plurality of wireless communications apparatuses;

calculating by each monitoring apparatus among the plurality of monitoring apparatuses, an estimated line that represents candidates of a position of the one wireless communications apparatus, the estimated line being calculated from an estimated distance between the monitoring apparatus and the one wireless communications apparatus, based on the hop count indicated by the obtained hop count information;

correcting by each monitoring apparatus among the plurality of monitoring apparatuses, the calculated estimated line based on information indicating a node-less area in which no wireless communications apparatus of the given area is present; and determining the position of the one wireless communications apparatus based on intersections of the corrected estimated lines.

8. A determining apparatus comprising:

a storage apparatus storing therein information received from a plurality of monitoring apparatuses disposed encompassing a given area having a plurality of wireless communications apparatuses; and a processing apparatus that processes the information stored in the storage apparatus, wherein the processing apparatus:

obtains for each monitoring apparatus among the plurality of monitoring apparatuses, hop count information that indicates a hop count of a wireless signal transmitted by one wireless communications apparatus among the plurality of wireless communications apparatuses and received by the monitoring apparatus via multi-hop communication by the plurality of wireless communications apparatuses, calculates for each monitoring apparatus among the plurality of monitoring apparatuses, an estimated line that represents candidates of a position of the one wireless communications apparatus, the estimated line being calculated from an estimated distance between the monitoring apparatus and the one wireless communications apparatus, based on the hop count indicated by the obtained hop count information, corrects for each monitoring apparatus among the plurality of monitoring apparatuses, the calculated estimated line based on information indicating a node-less area in which no wireless communications apparatus of the given area is present, and determines the position of the one wireless communications apparatus based on intersections of the corrected estimated lines.

9. A determining system comprising:

a plurality of monitoring apparatuses disposed encompassing a given area having a plurality of wireless communications apparatuses; and a determining apparatus that includes a storage apparatus storing therein information received from the plurality of monitoring apparatuses and a processing apparatus that processes the information stored in the storage apparatus, wherein the determining apparatus:

obtains for each monitoring apparatus among the plurality of monitoring apparatuses, hop count information that indicates a hop count of a wireless signal transmitted by one wireless communications apparatus among the plurality of wireless communications apparatuses and received by the monitoring apparatus via multi-hop communication by the plurality of wireless communications apparatuses, calculates for each monitoring apparatus among the plurality of monitoring apparatuses, an estimated line that represents candidates of a position of the one wireless communications apparatus, the estimated line being calculated from an estimated distance between the monitoring apparatus and the one wireless communications apparatus, based on the hop count indicated by the obtained hop count information, corrects for each monitoring apparatus among the plurality of monitoring apparatuses, the calculated estimated line based on information indicating a node-less area in which no wireless communications apparatus of the given area is present, and determines the position of the one wireless communications apparatus based on intersections of the corrected estimated lines.

10. A determining method comprising:

obtaining distance information indicating a distance between a first plurality of monitoring apparatuses disposed encompassing a given area having a plurality of wireless communications apparatuses;

causing a wireless signal to be transmitted and received among the first plurality of monitoring apparatuses via multi-hop communication by the plurality of wireless communications apparatuses;

calculating an estimated distance between the first plurality of monitoring apparatuses based on the hop count of the wireless signal transmitted and received among the first plurality of monitoring apparatuses;

making a determination concerning a node-less area in which no wireless communications apparatus of the given area is present, the determination being based on a result of comparison of the distance indicated by the obtained distance information and the calculated estimated distance;

obtaining by each monitoring apparatus among a second plurality of monitoring apparatuses disposed encompassing the given area, hop count information that indicates a hop count of a wireless signal transmitted from one wireless communications apparatus among the plurality of wireless communications apparatus and received by the monitoring apparatus via multi-hop communication by the plurality of wireless communications apparatuses;

calculating by each monitoring apparatus among the second plurality of monitoring apparatuses, an estimated line that represents candidates of a position of the one wireless communications apparatus, the estimated line being calculated from an estimated distance between the monitoring apparatus and the one wireless communications apparatus, based on the hop count indicated by the obtained hop count information;

correcting by each monitoring apparatus among the second plurality of monitoring apparatuses, the calculated estimated line based on a result of the determination concerning the node-less area; and determining the position of the one wireless communications apparatus based on intersections of the corrected estimated lines.

* * * * *